(12) United States Patent
Gore

(10) Patent No.: US 11,667,081 B2
(45) Date of Patent: *Jun. 6, 2023

(54) DOUBLE DUMP VALVE

(71) Applicant: Impossible Objects, Inc., Northbrook, IL (US)

(72) Inventor: Eugene Gore, Des Plaines, IL (US)

(73) Assignee: Impossible Objects, Inc., Northbrook, IL (US)

( * ) Notice: Subject to any disclaimer, the term of this patent is extended or adjusted under 35 U.S.C. 154(b) by 212 days.

This patent is subject to a terminal disclaimer.

(21) Appl. No.: 17/211,410

(22) Filed: Mar. 24, 2021

(65) Prior Publication Data

US 2021/0237359 A1 Aug. 5, 2021

Related U.S. Application Data

(63) Continuation of application No. 15/922,158, filed on Mar. 15, 2018, now Pat. No. 10,967,577.

(60) Provisional application No. 62/473,129, filed on Mar. 17, 2017.

(51) Int. Cl.
| | | |
|---|---|---|
| *B33Y 40/00* | (2020.01) | |
| *B29C 64/329* | (2017.01) | |
| *B29C 64/357* | (2017.01) | |
| *B29C 64/141* | (2017.01) | |
| *B33Y 30/00* | (2015.01) | |
| *B33Y 10/00* | (2015.01) | |
| *B29K 101/12* | (2006.01) | |

(52) U.S. Cl.
CPC .......... *B29C 64/357* (2017.08); *B29C 64/141* (2017.08); *B29C 64/329* (2017.08); *B33Y 10/00* (2014.12); *B33Y 30/00* (2014.12); *B33Y 40/00* (2014.12); *B29K 2101/12* (2013.01)

(58) Field of Classification Search
CPC .................................................. B29C 64/357
See application file for complete search history.

(56) References Cited

U.S. PATENT DOCUMENTS

| | | | | |
|---|---|---|---|---|
| 10,967,577 B2* | 4/2021 | Swartz | ................ | B29C 64/141 |
| 2017/0299074 A1* | 10/2017 | Masaki | ................ | F16K 15/033 |

FOREIGN PATENT DOCUMENTS

GB 190408431 A * 5/1904

* cited by examiner

*Primary Examiner* — Xiao S Zhao
*Assistant Examiner* — John J DeRusso
(74) *Attorney, Agent, or Firm* — Dunlap Bennett & Ludwig, PLLC

(57) ABSTRACT

A double dump valve apparatus has the doors flap open in opposite horizontal orientations and directions.

2 Claims, 29 Drawing Sheets

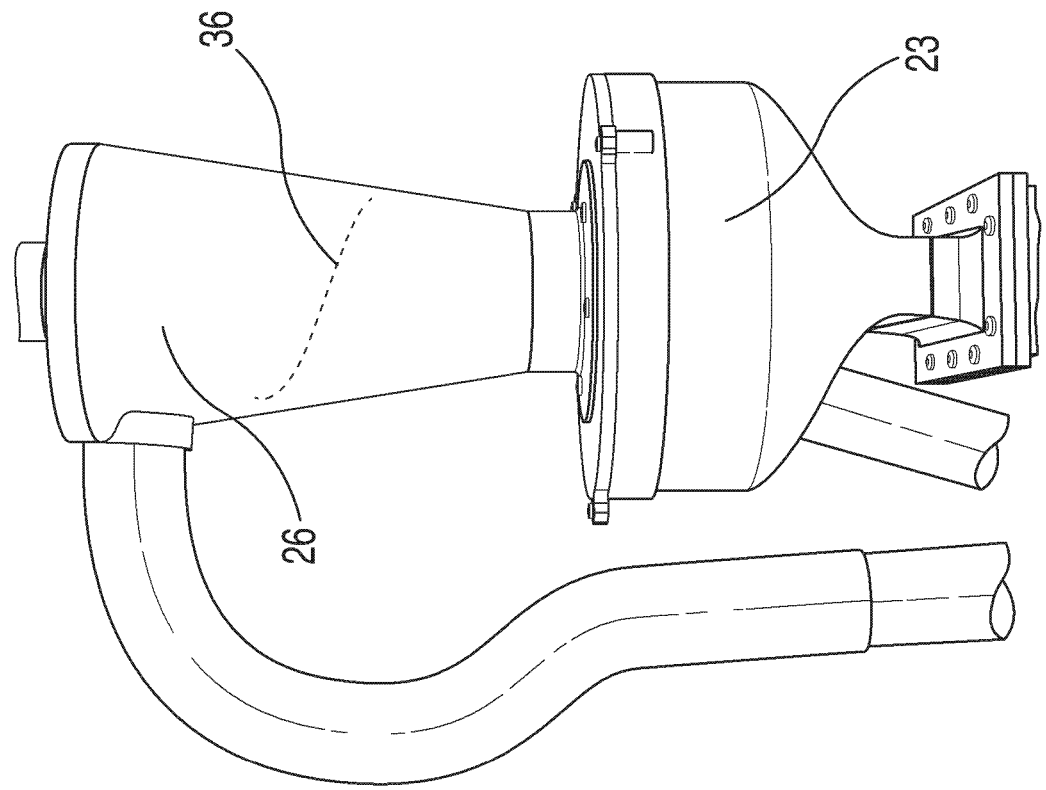
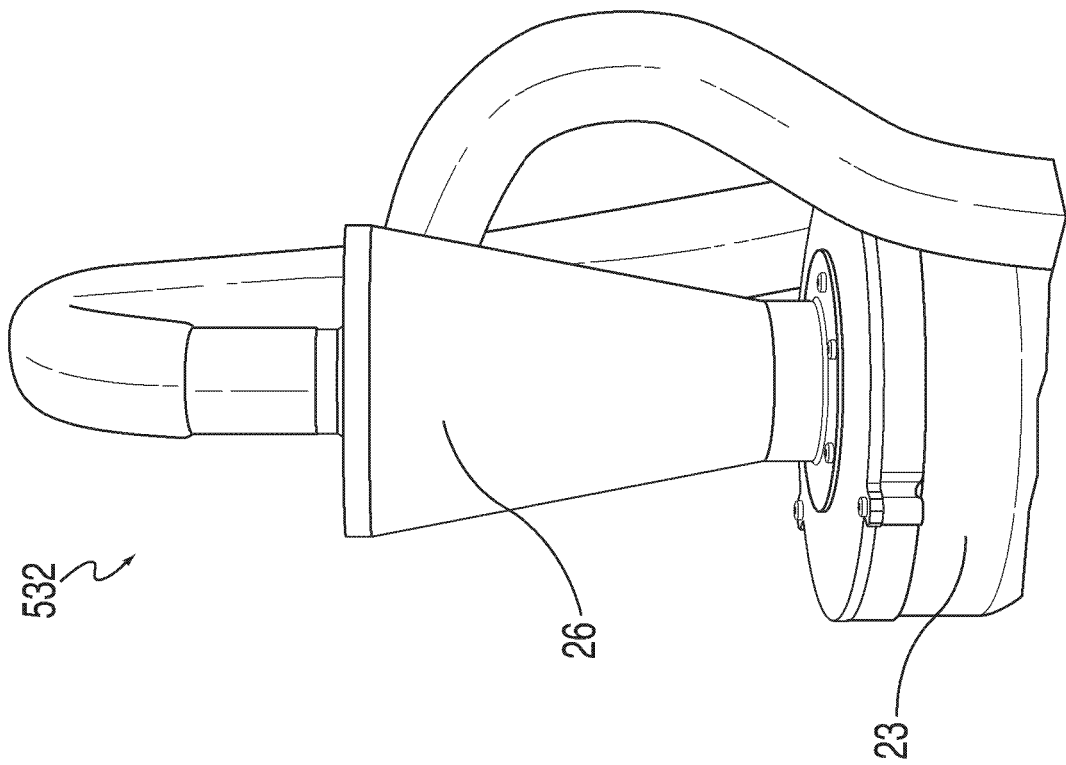
FIG. 7A
FIG. 7B

DOUBLE DUMP VALVE

This application is a continuation of U.S. application Ser. No. 15/922,158, filed Mar. 15, 2018, now U.S. Pat. No. 10,967,577, issued Apr. 6, 2021, which application is hereby incorporated by reference in its entirety, which claims the benefit of U.S. Provisional Application No. 62/473,129, filed Mar. 17, 2017, which application is hereby incorporated by reference in its entirety.

TECHNICAL FIELD OF THE INVENTION

The present invention relates to a powder system recycler for a printing process, with specific application to additive manufacturing and, in particular, to an apparatus that is a powder system recycler component of an apparatus for automated manufacturing of three-dimensional composite-based objects, and components thereof such as a double dump valve.

BACKGROUND OF THE INVENTION

Additive manufacturing, such as three-dimensional printing, can be seen as largely a materials science problem. One of the limitations of current methods is a limited materials palette and slow build speeds.

These and other limitations of the prior art are avoided by a methodology known as Composite-Based Additive Manufacturing (CBAM). CBAM is described in full in co-pending U.S. patent application Ser. No. 13/582,939, filed Nov. 2, 2012, Ser. No. 14/835,690, filed Aug. 25, 2015, and Ser. No. 14/835,635, filed Aug. 25, 2015, each of which is incorporated fully herein by reference.

International application no. PCT/US17/17672, filed Feb. 13, 2017 and U.S. application Ser. No. 15/611,320, filed Jun. 1, 2017, describe a particular method and apparatus for automating Composite-Based Additive Manufacturing (CBAM). International application no. PCT/US17/17672 and U.S. application Ser. No. 15/611,320 are incorporated fully herein by reference.

An original powder recycler used in the CBAM process had a cutoff point of 50 microns (that is, it would not recycle particles less than 50 microns). The powder recycler comprised a trough that would deposit powder onto substrate sheets (where the powder would stick to wetted regions on the sheets, the wetted regions corresponding to a layer image of a 3D object), a vacuum for removing excess powder and a recycler for recycling the excess powder using a dump valve to return the excess powder back into the trough. Due to the cutoff point of 50 microns, the device would recycle only those particles that were 50 microns or larger, while particles smaller than 50 microns would get discarded.

The particles used by the inventors of the present application in the CBAM process have a typical mean size in the range of 50 microns, with a distribution of larger and smaller particles, but the process is not limited to these sizes and can be used with many different particle mean sizes and distributions. Thus, using the original powder recycler, many particles (that is, those below 50 microns) were being discarded and thus wasted. In contrast, including the smaller particle sizes in the CBAM process is desirable, as its shown to improve the amount of powder that adheres to the printed substrate sheets. Consequently, the original powder recycler not only discarded and thus wasted the smaller particles, but also diminished the performance of the CBAM process.

Applicant found use of a different type of recycler overcame this problem in part, but led to subsequent problem in need of solution. Applicants discovered that substituting the original powder recycler with a helical cyclone overcame the problem of discarding smaller particles. However, the combination of the helical cyclone with the original dump valve caused backflow into the cyclone, preventing the powder from falling from the cyclone into the trough.

SUMMARY OF THE INVENTION

Applicants discovered a solution to the aforementioned problems in a design that combines the helical cyclone for retaining the smaller particles with a two-valve (gate or flap) system that prevents backflow into the cyclone. This design recycles a larger range of particle sizes including smaller ones. This application describes a particular recycler apparatus (or powder system apparatus) which is a part of an overall machine for a printing process. Applicants developed the embodiments in the context of making improvements to automated Composite-Based Additive Manufacturing (CBAM). The recycler improves the cutoff point of previous recyclers to 3 microns, from 50 microns. It thus recycles almost all of the powder and discards almost none of it. The solution also uses a subsystem with two valves/gates/flaps that alternately open and close to release powder into a trough.

BRIEF DESCRIPTION OF THE DRAWINGS

FIG. 7A shows a cyclone of the example recycler.

FIG. 7B shows FIG. 7A with powder swirling through it for recycling back to a trough.

DETAILED DESCRIPTION OF INVENTION

The Embodiment and its Related Subsystems Developed by the Applicants

Figure 1:
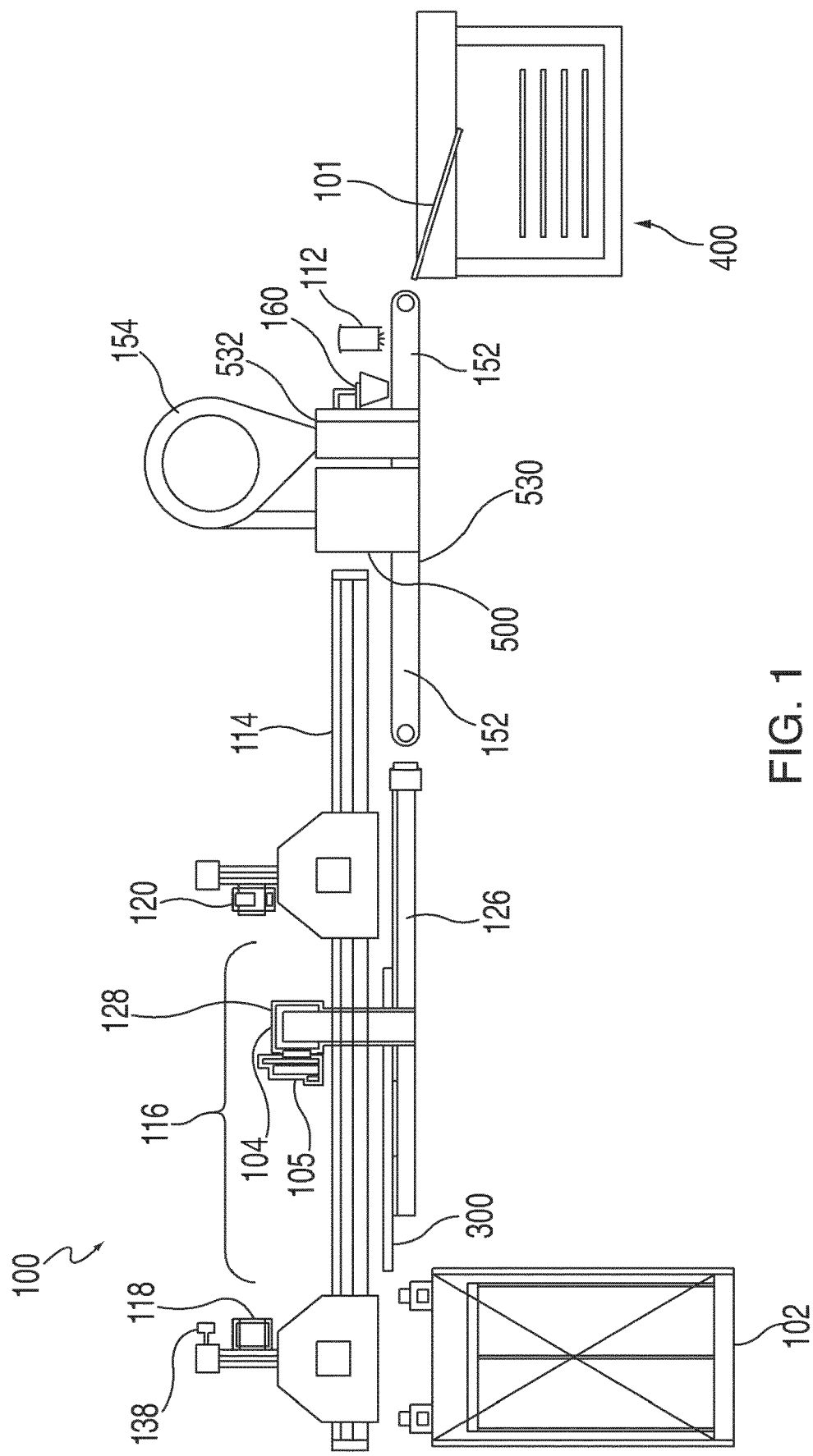
FIG. 1 is a schematic of an example embodiment of an apparatus for composite-based additive manufacturing.

The CBAM process described in the incorporated prior applications (U.S. patent application Ser. Nos. 13/582,939, 14/835,690, and 14/835,635) is automated by performing the steps through a number of components or subsystems that operate in a coordinated manner. The main components of an example embodiment of the machine 100 are shown in FIG. 1, and include a material feeder 102, a printer 104, a powder system 500 comprising a powder applicator 530 and powder remover/recycler 532, an optional fuser 112, a transfer system, and other elements that serve to connect and control the various components. While example components are shown in FIG. 1, various alternative and optional components are also suitable for use with the machine 100.

The material feeder 102 holds a stack of substrate sheets 101, such as carbon fiber sheets, and moves them into proper position so that a single sheet 101 at a time can be transferred to the printer platen 300 and printer 104. Sheets 101 are transferred to, and positioned for, the printer 104 by means of the transfer system. The printer 104 then deposits fluid at precise locations onto a substrate sheet 101 as in the incorporated prior applications (U.S. patent application Ser. Nos. 13/582,939, 14/835,690, and 14/835,635), and includes a punching mechanism for placing registration holes in the sheet 101 at desired locations. The registration holes are placed in precise, pre-defined positions relative to the position of the layer images printed onto the sheets. This can be accomplished by mounting the punches on the same frame that the printing mechanism is placed, or using other alignment mechanisms that are well known in the art.

The powder applicator 530 then deposits thermoplastic powder onto the substrate sheet 101, whereupon the powder adheres to the areas of the sheet 101 that have been made wet by the printer 104, i.e., the layer images. In typical application, the powder applicator is a trough containing powder. The trough has a slitted opening on its underside and is connected to an electromechanical vibrator. The vibrator, when active, causes powder to flow downward through the slitted opening and out of the trough. The vibrator is actuated when a sensor circuit (not shown) senses the presence of sheet 101 underneath as it passes on the conveyor. When the sheet has completely passed, the vibrator deactivates and powder ceases flowing downward from the trough.

The powder remover 532 removes any powder that did not adhere to the sheet 101. In typical application, this is a vacuum system coupled to the cyclone (to be described later). A star wheel assembly (not shown) holds down edges of sheet 101 as it passes near the powder remover 532, to prevent the vacuum force from lifting the sheet from the conveyor. Those star wheels (thin disks of metal) roll at the same speed as the conveyor. The fuser 112, which is optional, heats the powder on the substrate sheet 101 in a manner sufficient to cause the powder to melt and thereby affix to the sheet 101, so that the powder remains on the sheet 101 when and if the underlying fluid from the printer 104 dries. This cycle is repeated for as many additional substrate sheets 101 as required for making a specified three-dimensional (3D) part or object, with each sheet 101 normally representing a layer of the 3D part or object. The apparatus also includes a stacker subsystem 400 for stacking the sheets in register, based on the aforementioned punched holes.

Also shown in the embodiment of the machine depicted in FIG. 1 is a distance sensor 138, Coanda or felted-material gripper 118, XYZ positioner 116, X positioner 126, Y positioner 128, print heads 105, needle or felted-material gripper 120, rails 114, conveyor 152, cyclone 154, and air knife 160. These components are described in detail in international application no. PCT/US17/1772 and U.S. application Ser. No. 15/611,320.

Figure 2:
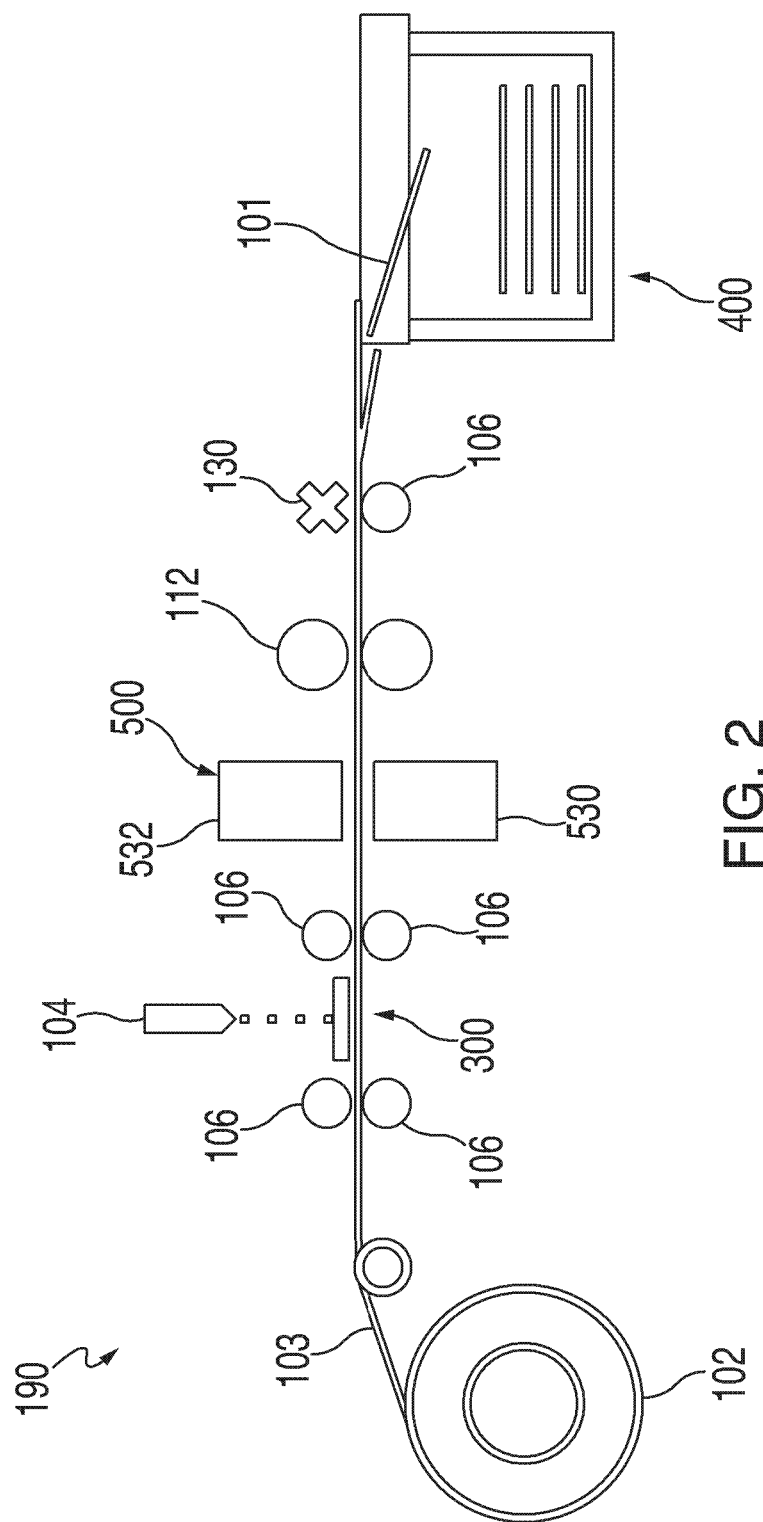
FIG. 2 depicts a roll-based continuous feed apparatus for composite-based additive manufacturing.
Figure 3:
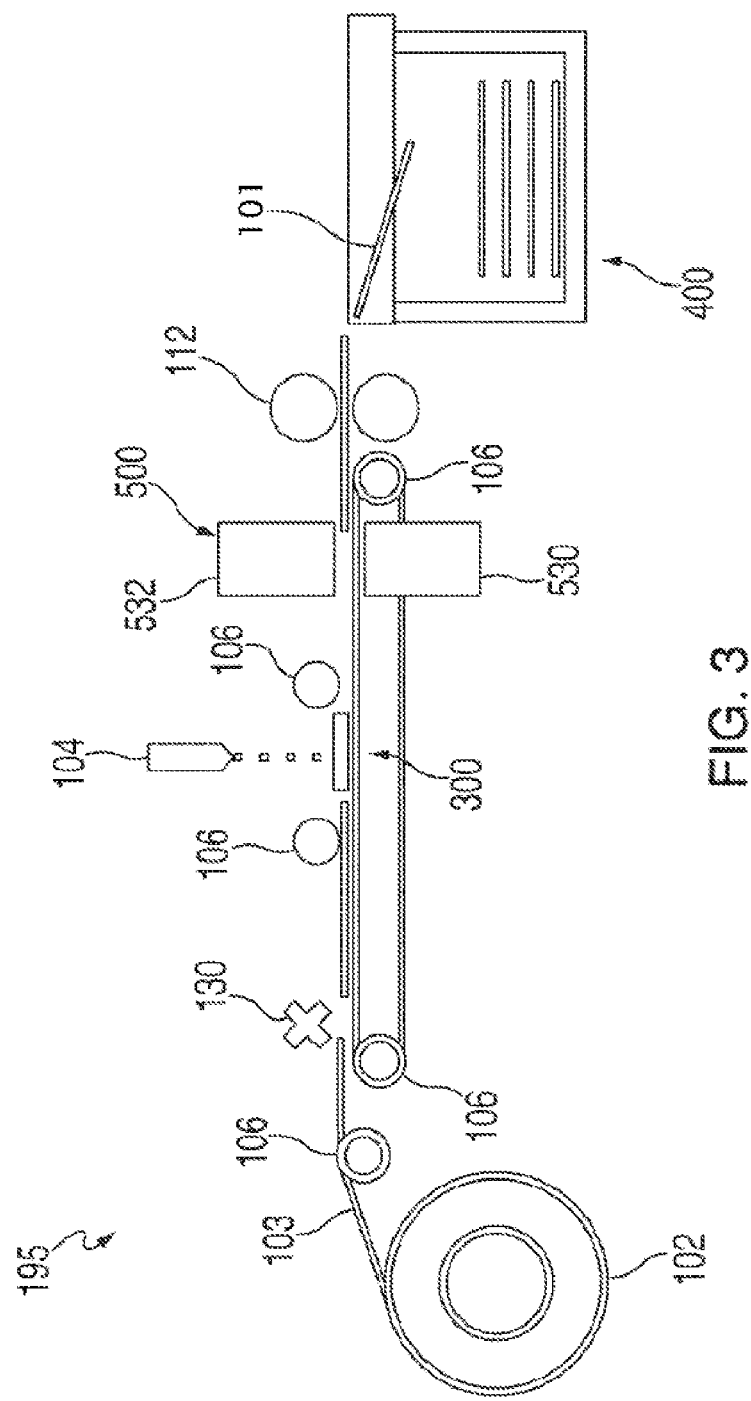
FIG. 3 depicts a roll-based roll to sheet apparatus for composite-based additive manufacturing.

Instead of using substrate sheets, a roll of substrate material may be used in the CBAM process and automated machine. FIG. 2 depicts a continuous feed roll implementation 190, and FIG. 3 depicts a roll to sheet implementation 195. In these embodiments, a roll of substrate material 102 is mounted and situated ahead of the printer 104. A tensioning system 103 together with feed rollers 106 are used to hold and advance the web defined by the length of the roll material fed through the system. The web 102 can extend through all of the components of the system—printer 104, powder system 500 comprising powder applicator 530 and powder remover/recycler 532, and, if present, fuser 112— and then be cut by a cutter 130 into single sheets 101 prior to stacking by the stacker subsystem 400. This is depicted in FIG. 2. Alternatively, as depicted in FIG. 3 the web 102 may be cut by the cutter 130 into single sheets 101 at any prior point in the process. For example, the web 102 may be converted to a single sheet 101 prior to advancing the resulting sheet 101 onto the printer platen 300. The web 102 may be converted to a single sheet after the leading edge is situated on the platen 300. The web 102 may be converted to a single sheet after the printing operation is completed and before the resulting sheet is fed into the powder applicator 530, and so on.

Recycler Subsystem

The recycler 532 of the present invention has a 3-micron cutoff (particles smaller than 3 microns will be discarded rather than recycled by the recycler). The 3-micron cutoff of the recycler 532 disclosed in the present invention is lower than previous recyclers which only had a 50-micron cutoff. So for the 3 micron cutoff machine, most particles get recycled whereas in the 50 micron cutoff machine, a substantial proportion of particles did not get recycled.

In a prior system, a dump valve cylinder (disclosed in International Application No. PCT/US17/17672 and U.S. application Ser. No. 15/611,320—see FIGS. 18-23 and corresponding explanation in the specification) was the final subsystem that placed powder into a trough. The dump valve cylinder was in a casing that has a top hole and bottom hole. As the cylinder rotated, the powder that was condensed in the old cyclone dropped through the top hole in the casing and into the cylinder. As the cylinder rotated 180 degrees, the cylinder closed the vacuum inside the cyclone. The powder then fell out of the cylinder through the bottom hole in the casing and into a trough. The problem with this dump valve design is that it only works with certain powders that are heavier (bigger particles). In order for the cylindrical valve to work, it should allow some air backflow into the cyclone. That design works when the particles are heavy enough (large enough) that the air backflow does not prevent them from continuing to drop down (against the backflow) and passing through the valve into the trough. This feature develops into a problem when smaller/lighter particles succeed in traveling toward the trough because the air backflow prevents them from passing through the valve and into the trough.

Figure 4B:
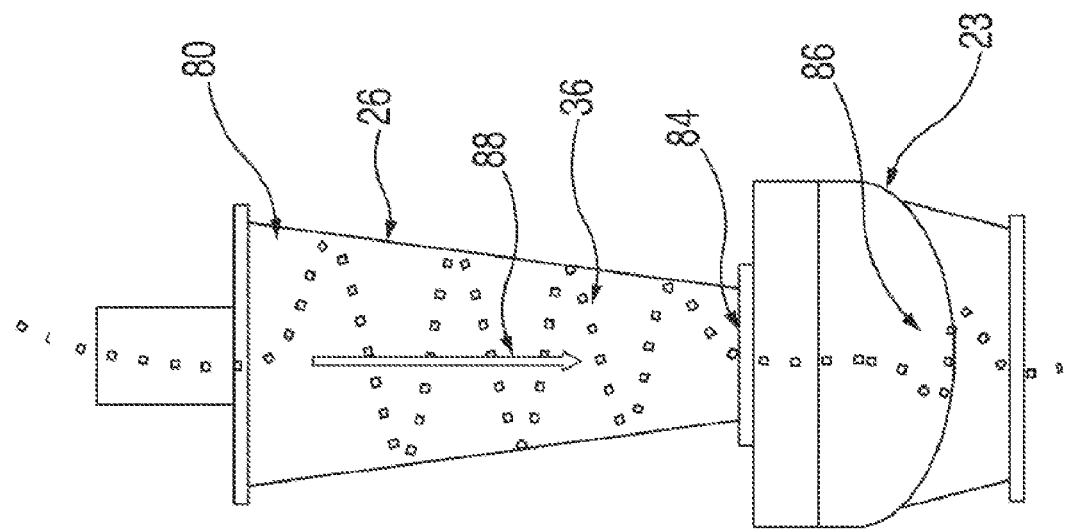
FIG. 4B is a schematic representation of a collector system.
Figure 4A:
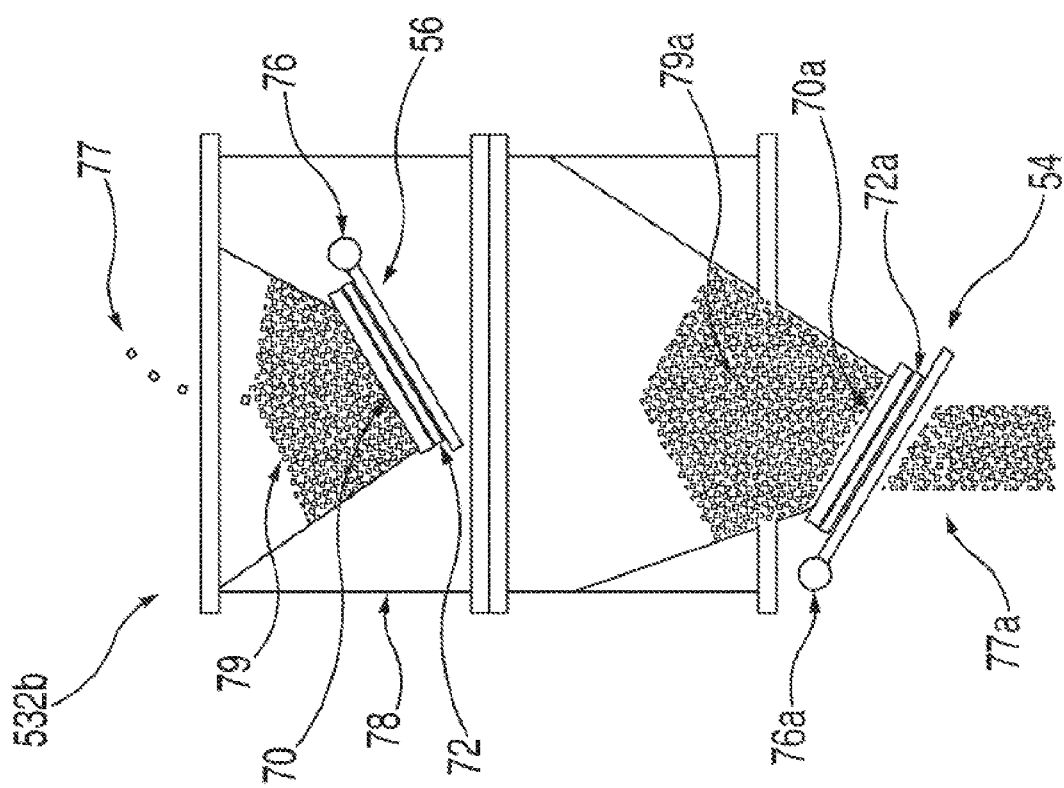
FIG. 4A is a schematic representation of a two-valve recycler.

FIG. 4A shows a schematic of part of a recycler valve system 532*b* with two valves which solves the problem. The preferred embodiment uses a depression with a flange 70 on a cyclone or other container 79. The invention has rubber gaskets 72 and a valve 56 connected to an axis 76, at a slant to the vertical. There are two valves 56, 54 in a chamber 78. The other cyclone container/valve has the opposite horizontal orientation (see 70*a*, 72*a*, 54, and 76*a*). One axis 76 allows valve 56 to open to one side, and the other axis 76*a* allows valve 54 to open to the other side. The design is called an aerodyne-style valve, which has preexisting uses in ash collection in industrial settings. See Aerodyne Dust Collector Valve website, http://www.dustcollectorhq.com/dust-collector-valves.html (last accessed Nov. 14, 2017). Its use is heretofore unknown in print processes or additive manufacturing. If both valves (56, 54) are closed, the volume in the upper part of cyclone 79 (the volume opposite parts 70, 72, 56, and 76, and not shown in FIG. 4A) is insulated from the outside. As the powder 77 flows into the top portion of the cyclone 79 (which was vacuumed at nozzle 532*a* from recycler portion), it drops down through and is collected at the bottom portion of the cyclone 79 (as depicted in the figure). Then valve 56 opens and the collected powder propagates down to the lower valve volume 79*a*. Then valve 56 closes. Then valve 54 opens, and then powder 77*a* goes down onto a powder applicator trough 530 and then (if sensor-actuated vibration is occurring) onto the substrate sheet. This arrangement prevents airflow going up into the cyclone. Injecting air from the bottom would have stopped or degraded the operation of helical airflow that is intended to advantageously flow tangent along the inner cyclone surface to cause downward movement of powder.

FIG. 4B is a schematic of the collector system which is above the two-valve system shown in FIG. 4A. A collector 23 is necessary because a cyclone 26, with air blown in (at item 80) creates a helical swirl 36 in an "I" direction 88, and it is necessary to not disrupt the flow of the powder in the "I" direction 88 as it exits the system. Thus, there must always be a collection area beyond point 84 of the swirl 36 so the powder 77 can accumulate at 86.

Figure 5:
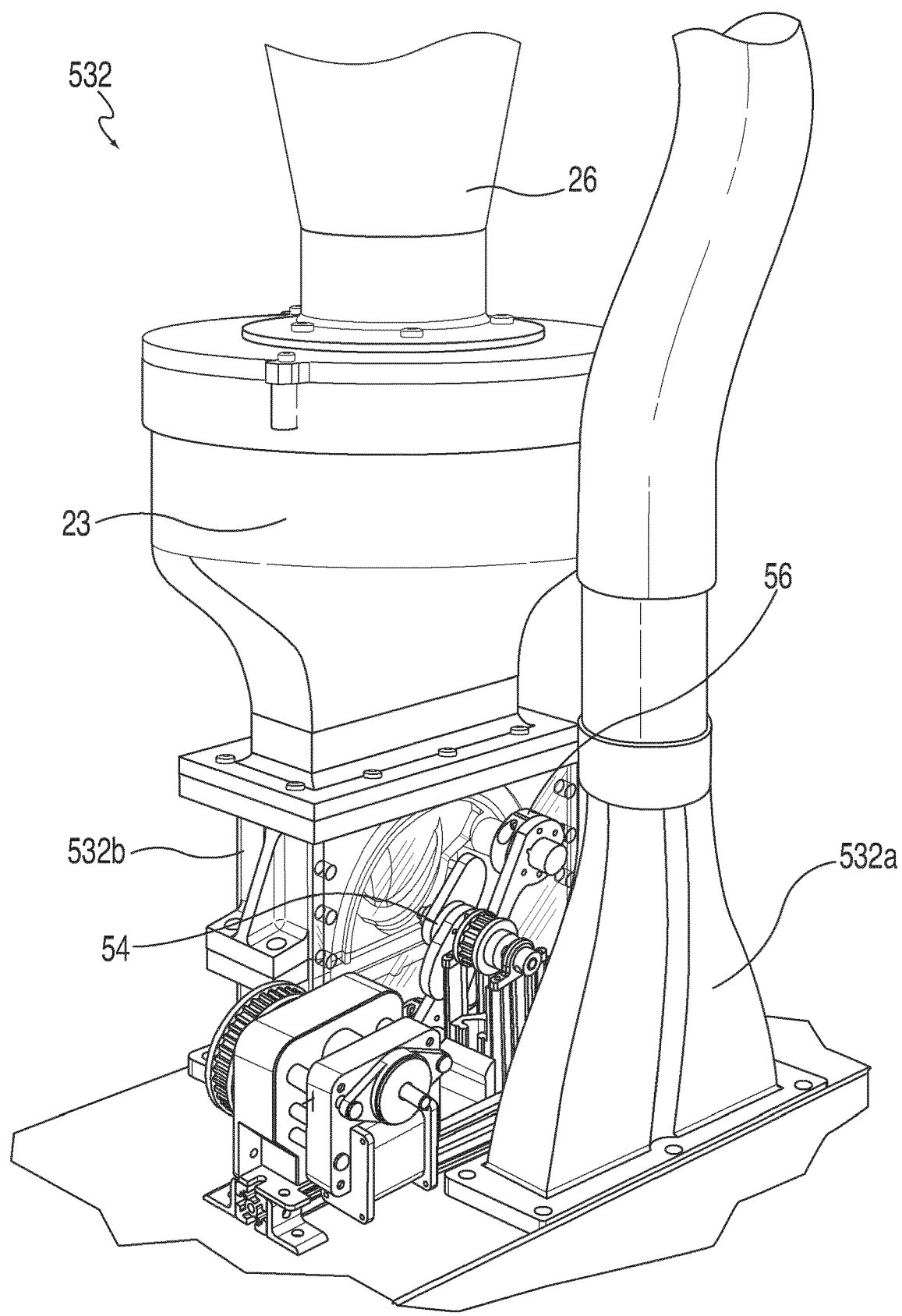
FIG. 5 shows the bottom rear of an example recycler.

FIG. 5 illustrates an embodiment of the bottom rear of an example recycler system 532, including powder vacuum nozzle 532*a* and valve system 532*b*. Valve system 532*b* puts the recycled powder back into a powder applicator trough 530 (see FIG. 17). Item 26, the recycler cyclone, can be purchased from Oneida®, trade name Dust Deputy. See https://www.oneida-air.com/category.asp?Id=%7bCC6B6F2A-E3D7-4F18-A53C-B5C357DFE131%7d&utm_source=direct&utm_medium=redirect&utm_campaign=Dust_Deputy (last accessed Nov. 14, 2017).

However, the cyclone alone does not work because of the way the particles get recycled. Therefore an entire design is needed (including the cyclone) so that particles get recycled. Item 532*b* (valve system) ensures that the powder falls into the trough as already described in the context of FIGS. 4A and 4B. After a significant amount of powder is accumulated, the powder (not the air) is released without backflow. Valve 56 will close, and another valve 54 will open, to allow only powder to flow down to the trough and not allow air to flow up to the cyclone.

Figure 6A:
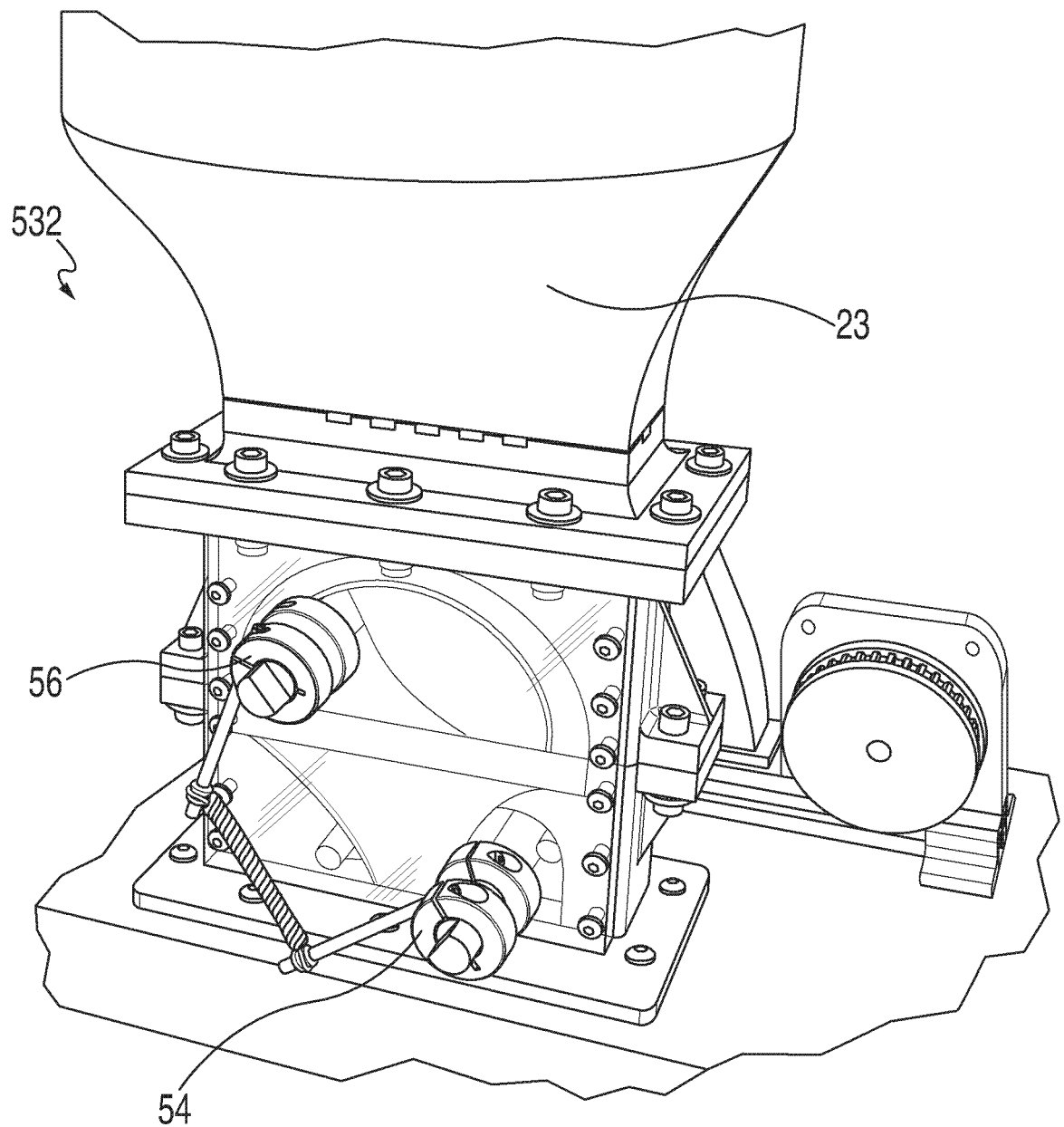
FIG. 6A shows the bottom front of an example recycler.
Figure 6B:
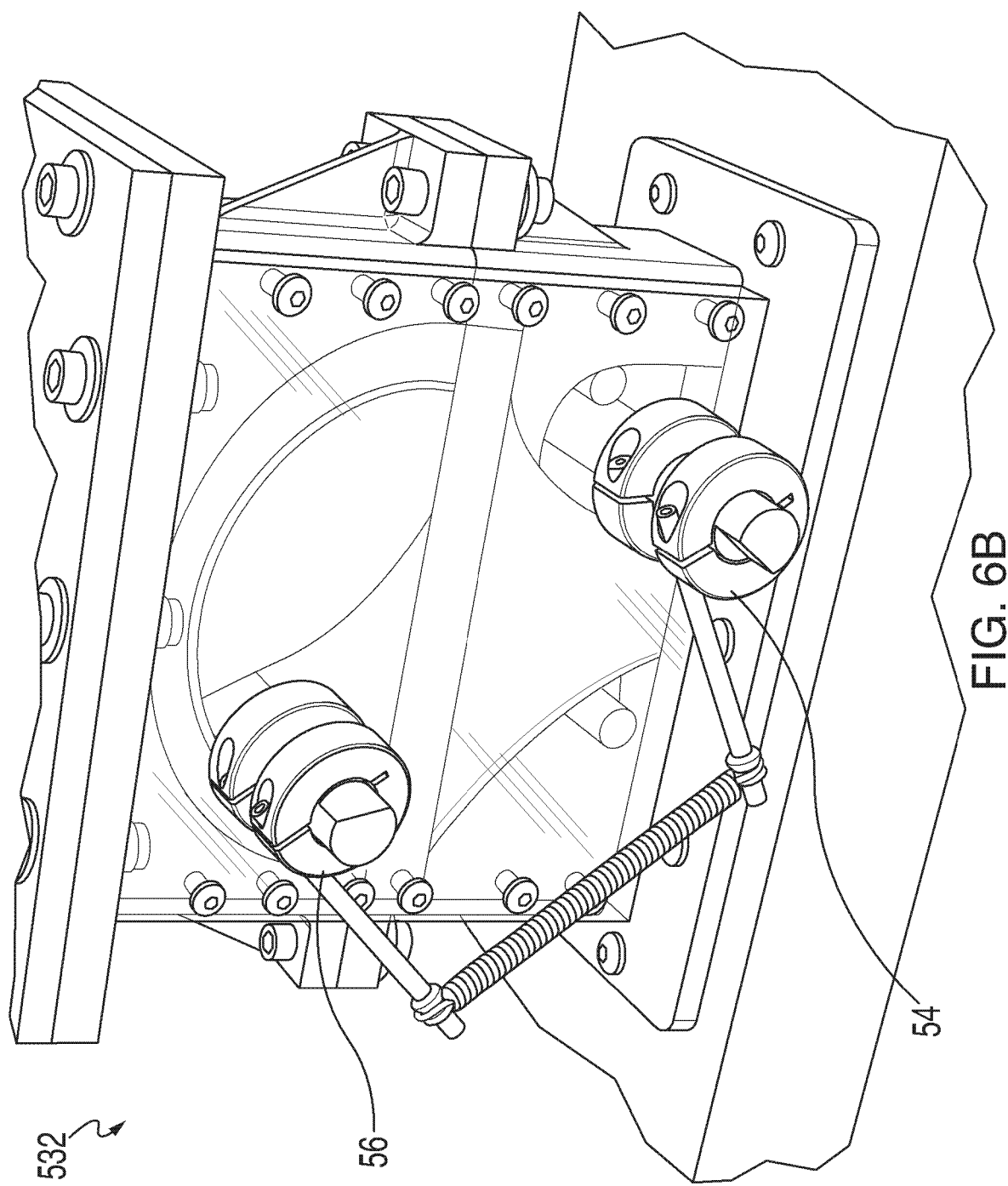
FIG. 6B shows an open valve and a closed valve during recycling.
Figure 6C:
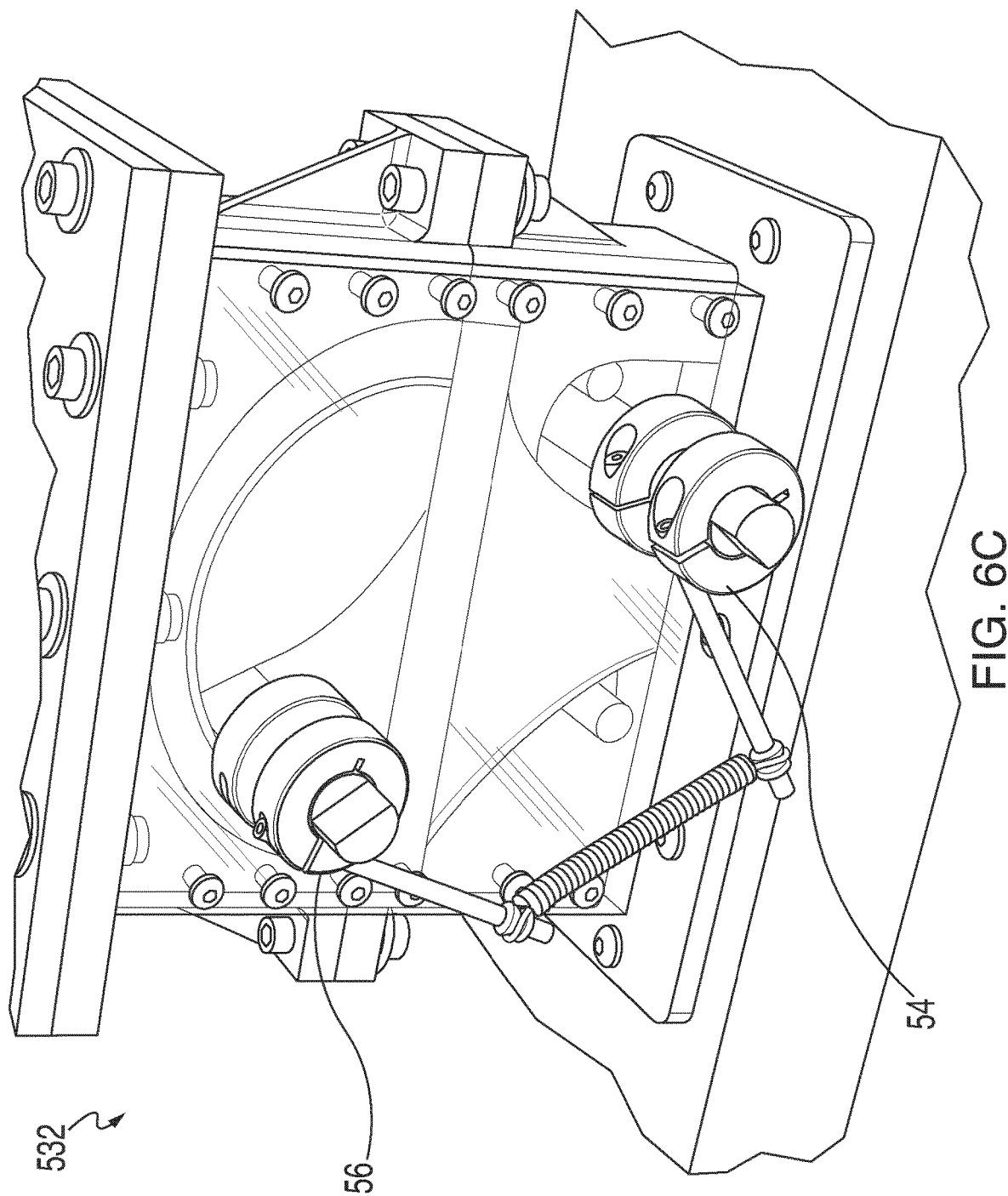
FIG. 6C shows a closed valve and a closed valve during recycling.
Figure 6D:
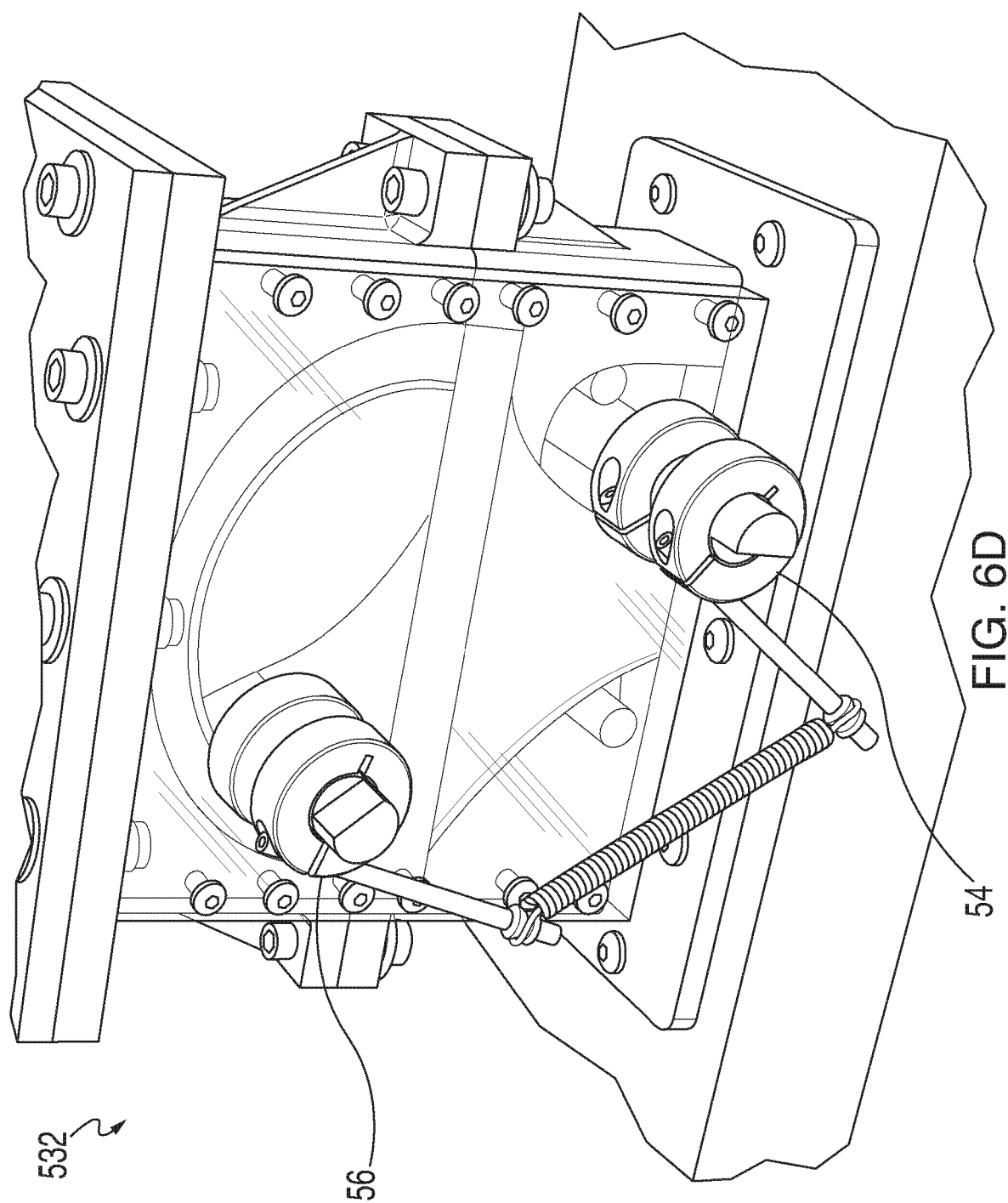
FIG. 6D shows a closed valve and an open valve during recycling.

FIG. 6A illustrates the bottom front of an example recycler system 532. The recycling process works as follows. Valve 54 opens, and valve 56 closes, and vice versa. So long as either valve is closed (which is always the case), the powder accumulates all the time in the powder collector 23. Most of the time valve 56 is closed and powder accumulates into a first container situated immediately above valve 56 (see, e.g., container 79 in FIG. 4A). Then valve 54 is closed also. After, valve 56 opens and powder flows from the first container into the chamber between valves 56, 54 (see, e.g., chamber 78 in FIG. 4A) (there is no air back flow because it's blocked by valve 54), then valve 56 closes. Then valve 54 opens and allows powder to flow through (there is no air back flow because it's blocked by valve 56) and into trough 530. Then valve 54 closes. Then the cycle starts again. A mechanism ensures that valves 54 and 56 alternately open and close. Valves 54 and 56 opening and closing is shown in FIGS. 6B-6D. In FIG. 6B, valve 56 is open and valve 54 is closed. In FIG. 6C, valve 56 is closed and valve 54 is closed. In FIG. 6D, valve 56 is closed and valve 54 is open. The mechanical system which performs this can be seen in FIGS. 5-17. These consist of springs, cams, motors, gears, and other components to perform the mechanical movement that is necessary.

FIG. 7A illustrates a cyclone 26 of an embodiment of an example recycler 532. In this embodiment, the Oneida® Dust Deputy cyclone 26 replaces the cyclone 154 disclosed in PCT/US17/17672 and U.S. application Ser. No. 15/611, 320. In operation of this type of cyclone, the powder swirls at the top of the device. FIG. 7B (using an ordinary vacuum motor) shows the powder 36 swirling in the cyclone 26.

Figure 8:
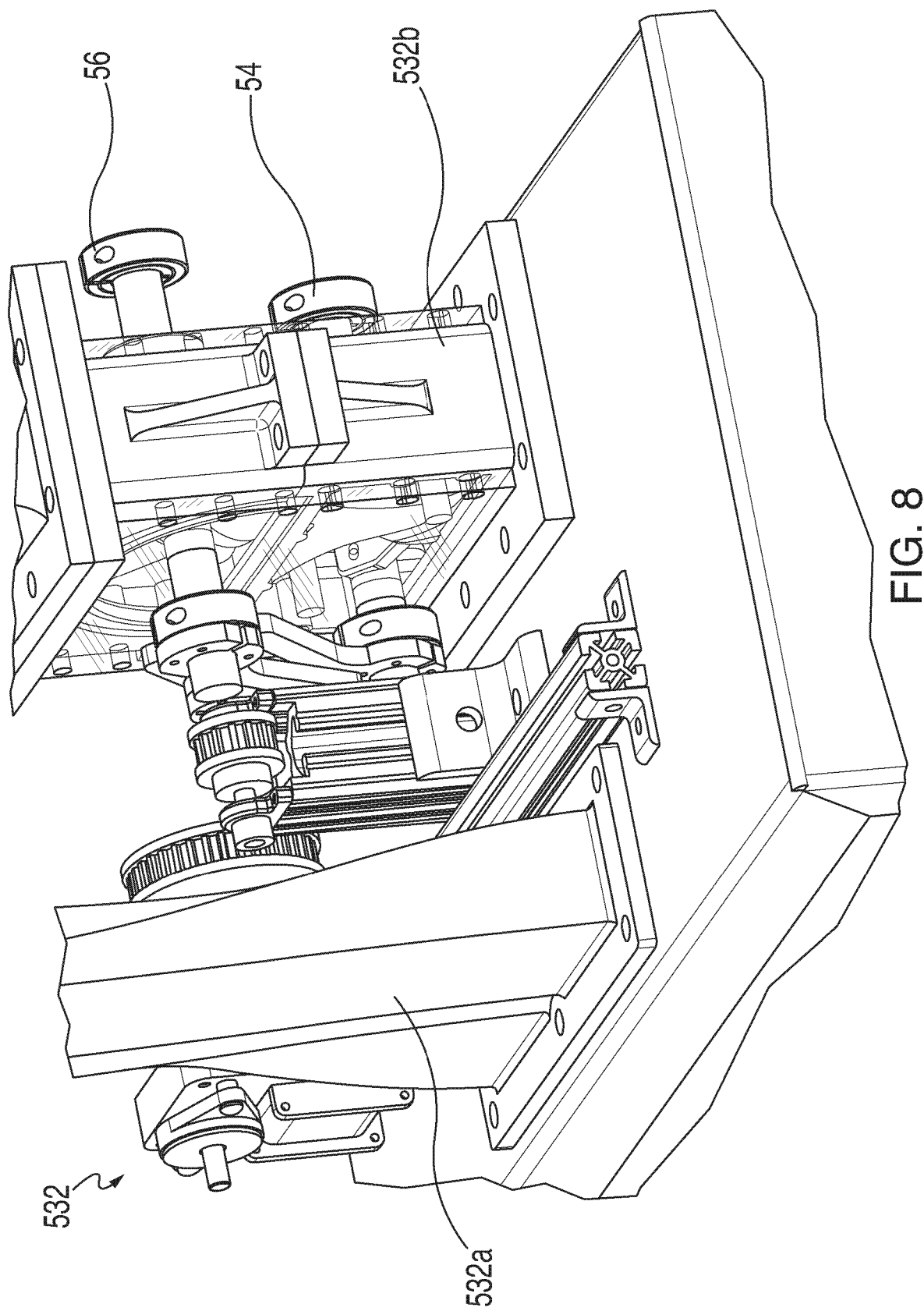
FIG. 8 is a perspective view of the bottom side of another embodiment an example recycler.
Figure 9:
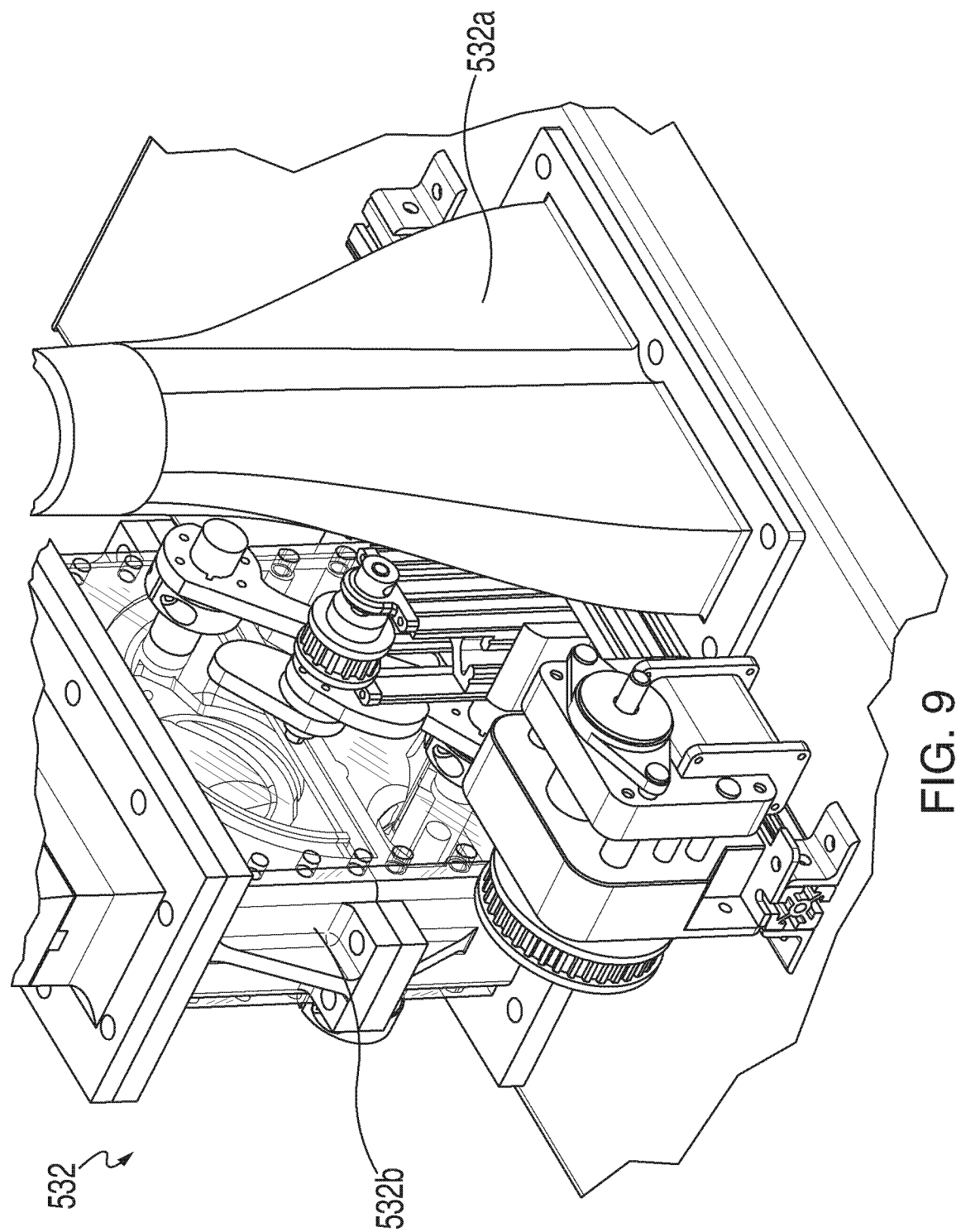
FIG. 9 is a perspective view of a bottom rear side of the example recycler.
Figure 10:
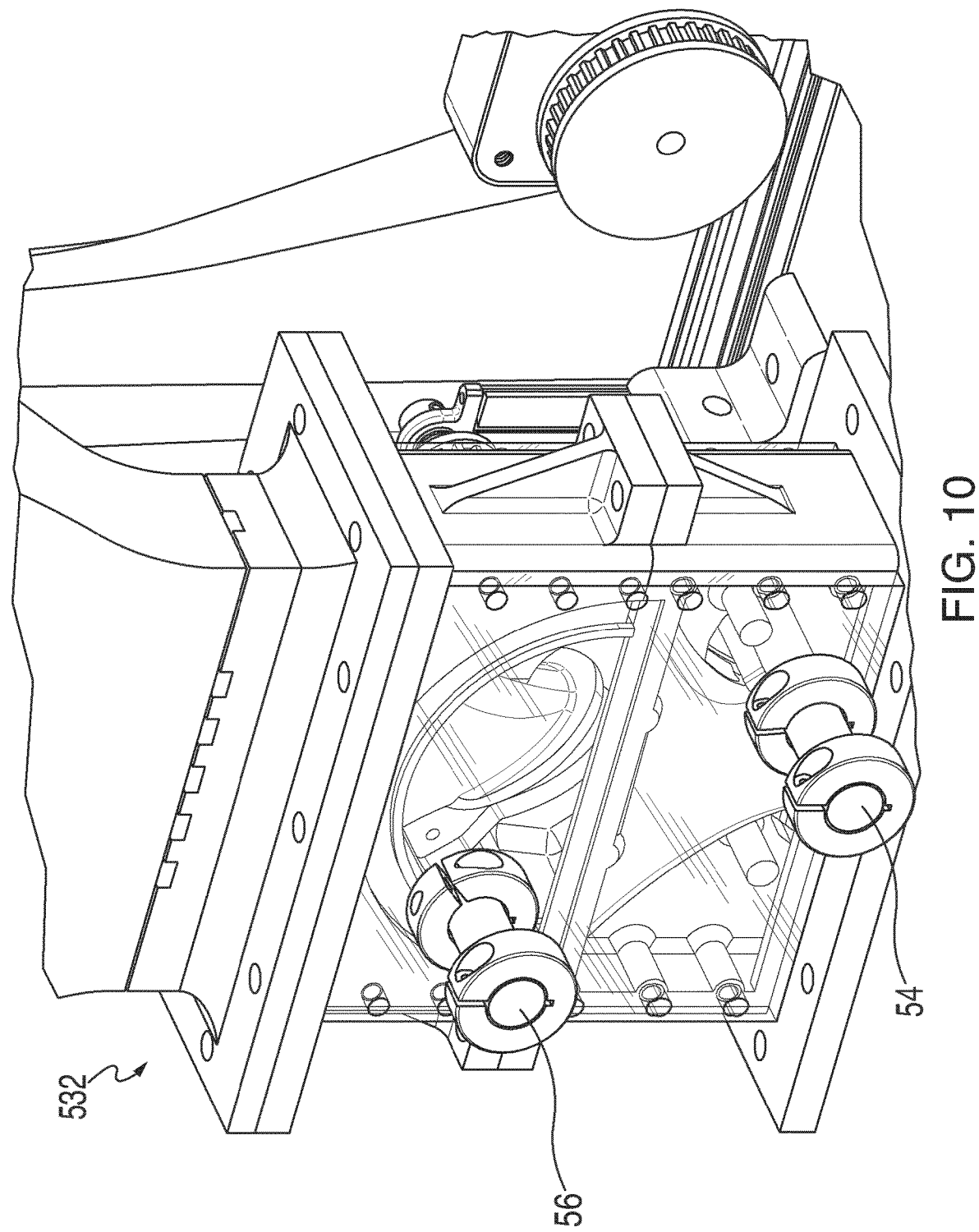
FIG. 10 is a perspective view of the bottom front side of the example recycler.
Figure 11:
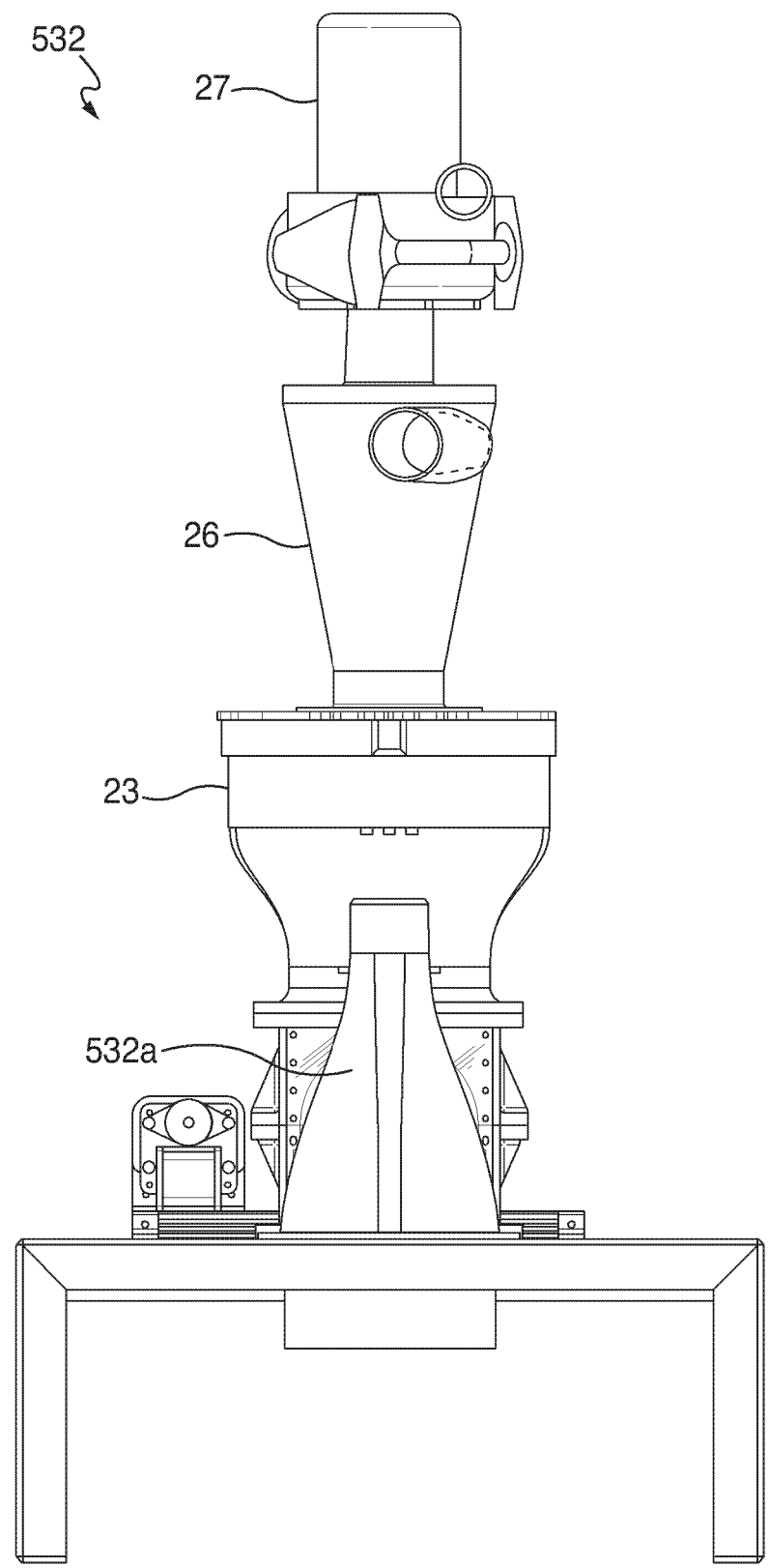
FIG. 11 is a rear view of the example recycler.
Figure 12:
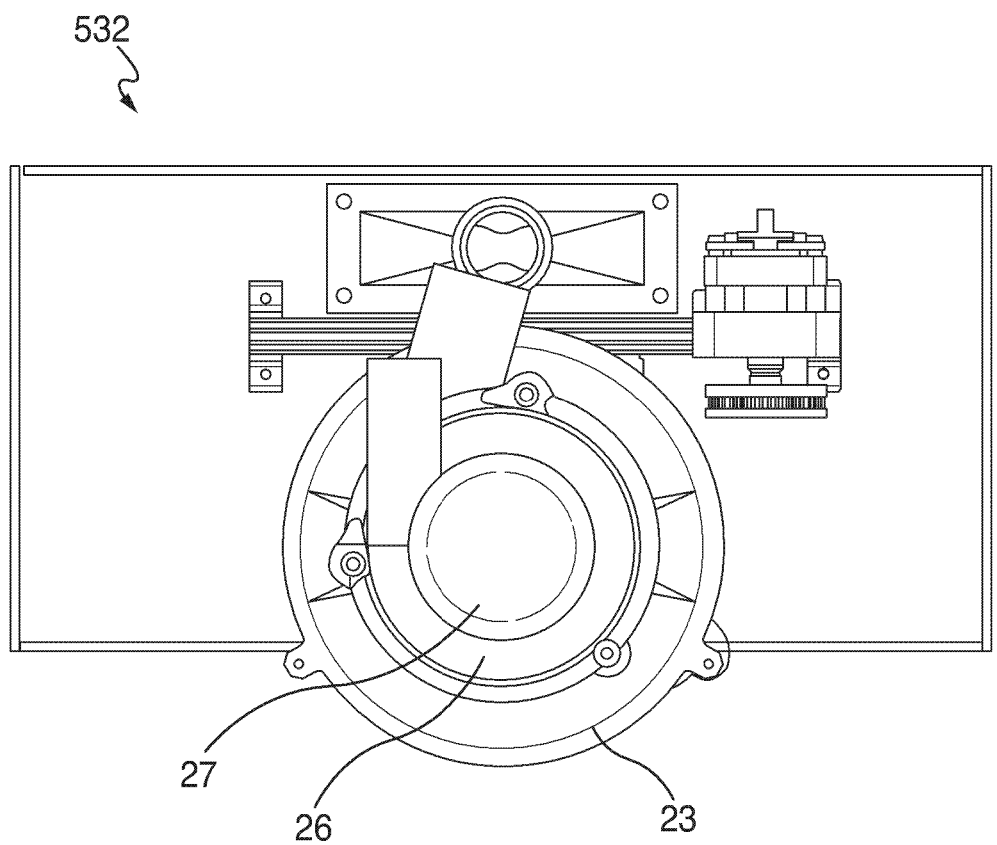
FIG. 12 is a top view of the example recycler.
Figure 13:
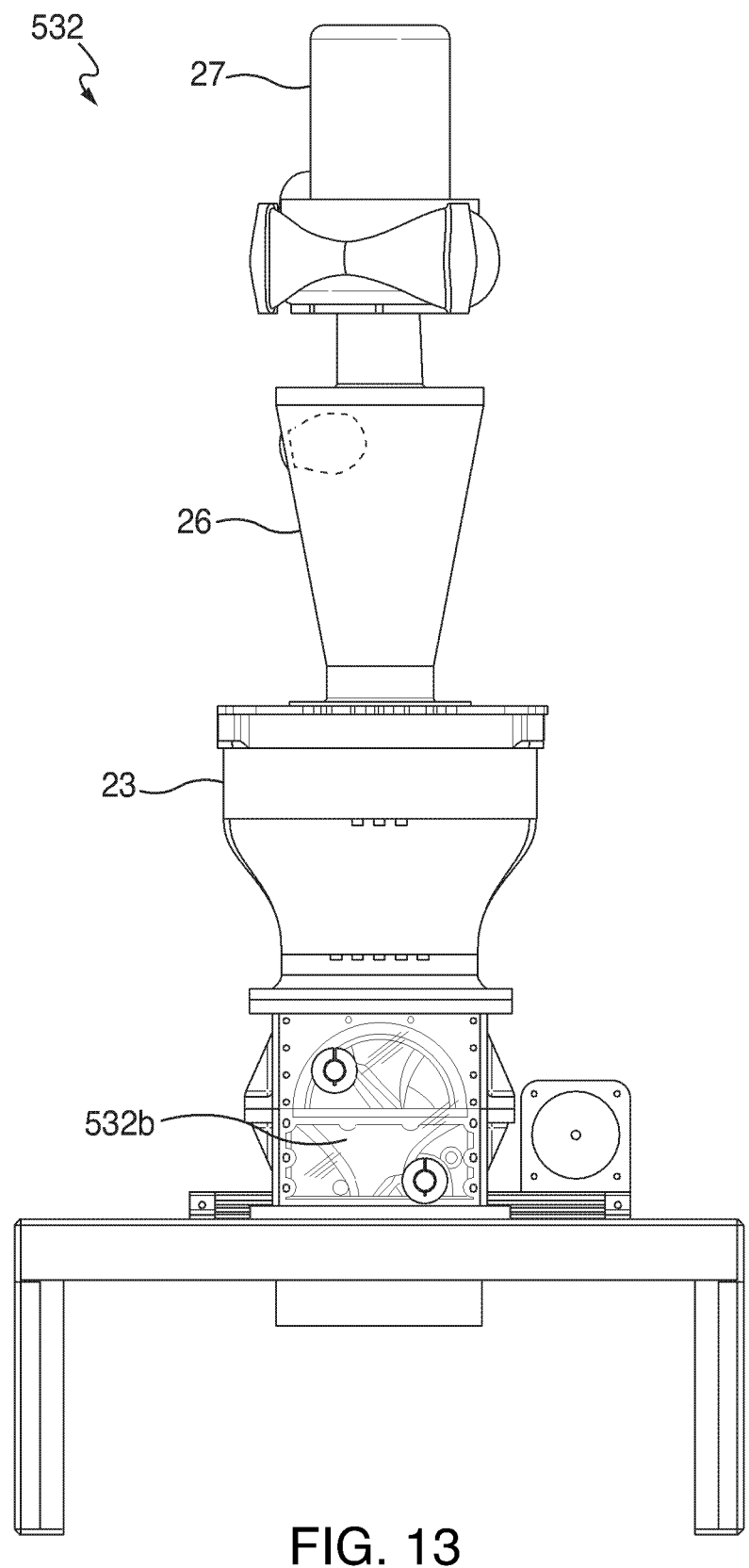
FIG. 13 is a front view of the example recycler.

FIGS. 8-16 show other views of the recycler 532. FIG. 8 is a perspective view of the bottom side of the embodiment of an example recycler 532. FIG. 9 is a perspective view of the bottom rear side of the example recycler 532. FIG. 10 is a perspective view of the bottom front of the example recycler 532. FIG. 11 is a rear view of the example recycler 532. Vacuum motor 27 is shown at the top in communication with the vacuum nozzle 532*a*. FIG. 12 is a top view of the example recycler 532. FIG. 13 is a front view of the example recycler 532.

Figure 14:
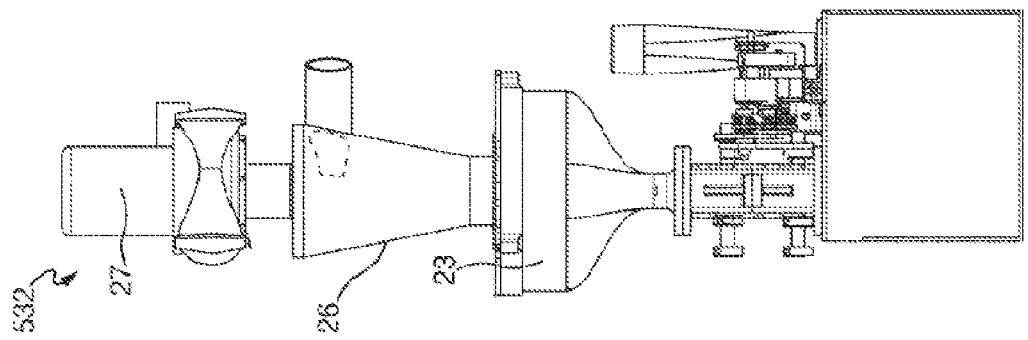
FIG. 14 is a side view of the example recycler.

FIG. 14 is a side view of the example recycler 532.

Figure 16:
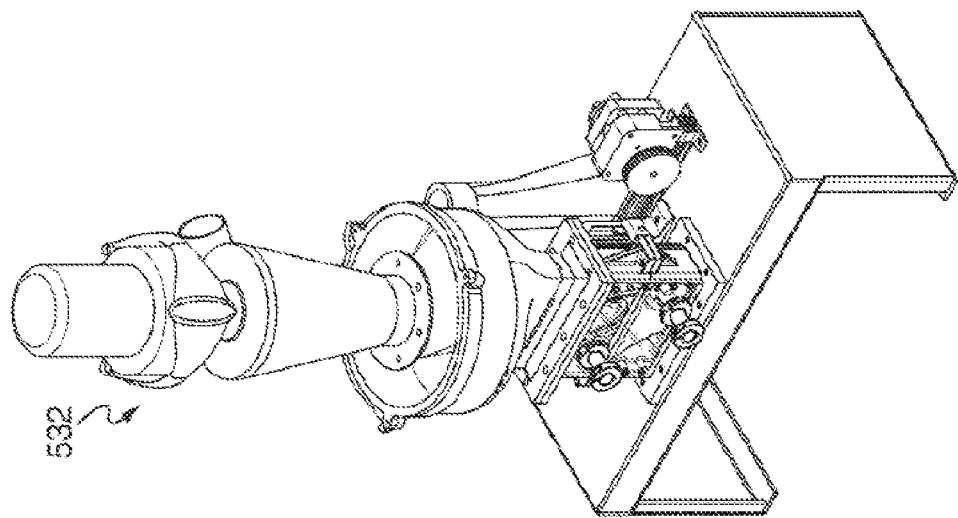
FIG. 16 is another isometric front view of the example recycler.
Figure 15:
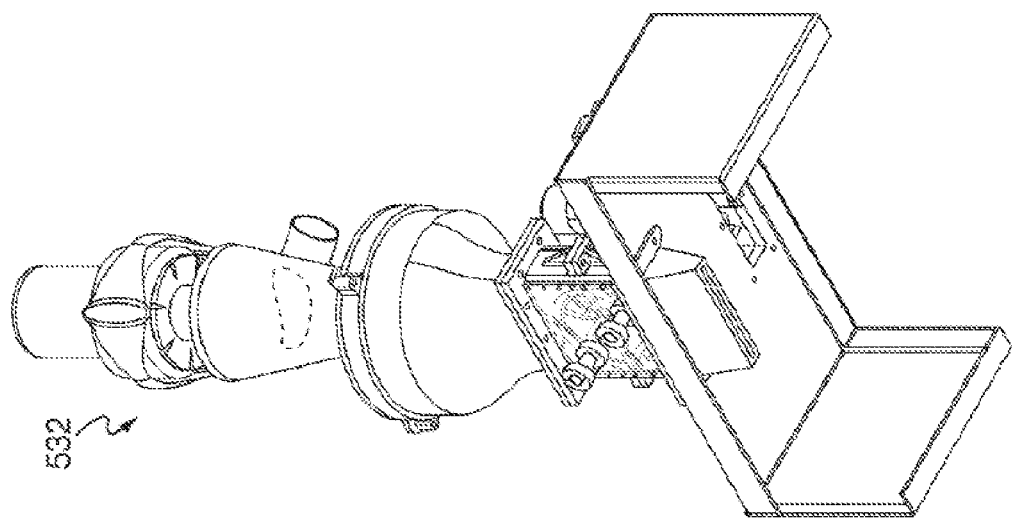
FIG. 15 is an isometric front view of the example recycler.
Figure 17:
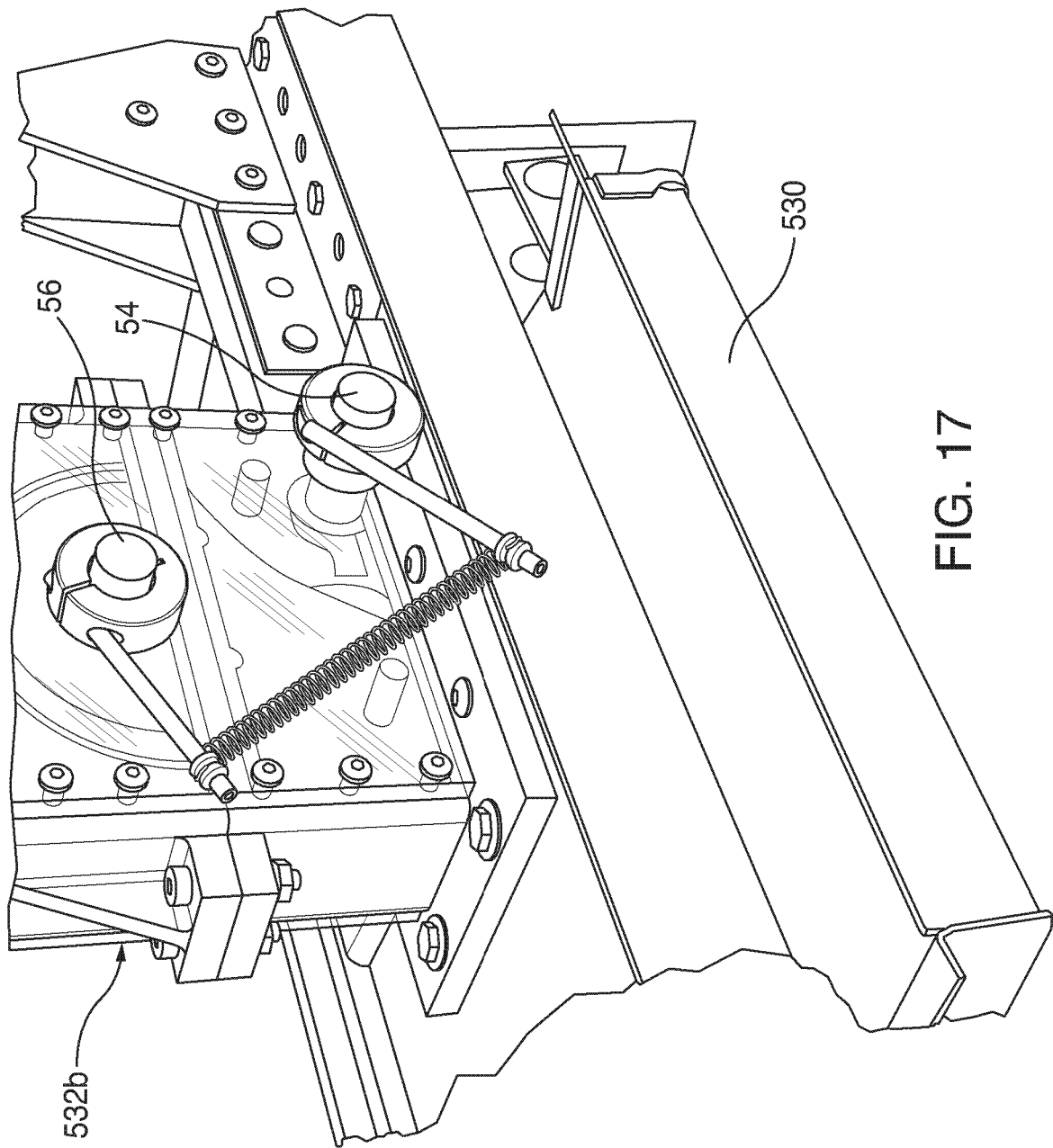
FIG. 17 shows a trough of powder that applies powder to a sheet, situated under the recycler system.

FIG. 15 is an isometric front view of the recycler system 532. FIG. 16 is another isometric front view of the recycler 532. FIG. 17 shows a powder applicator trough 530 of powder under the recycler 532.

Figure 18:
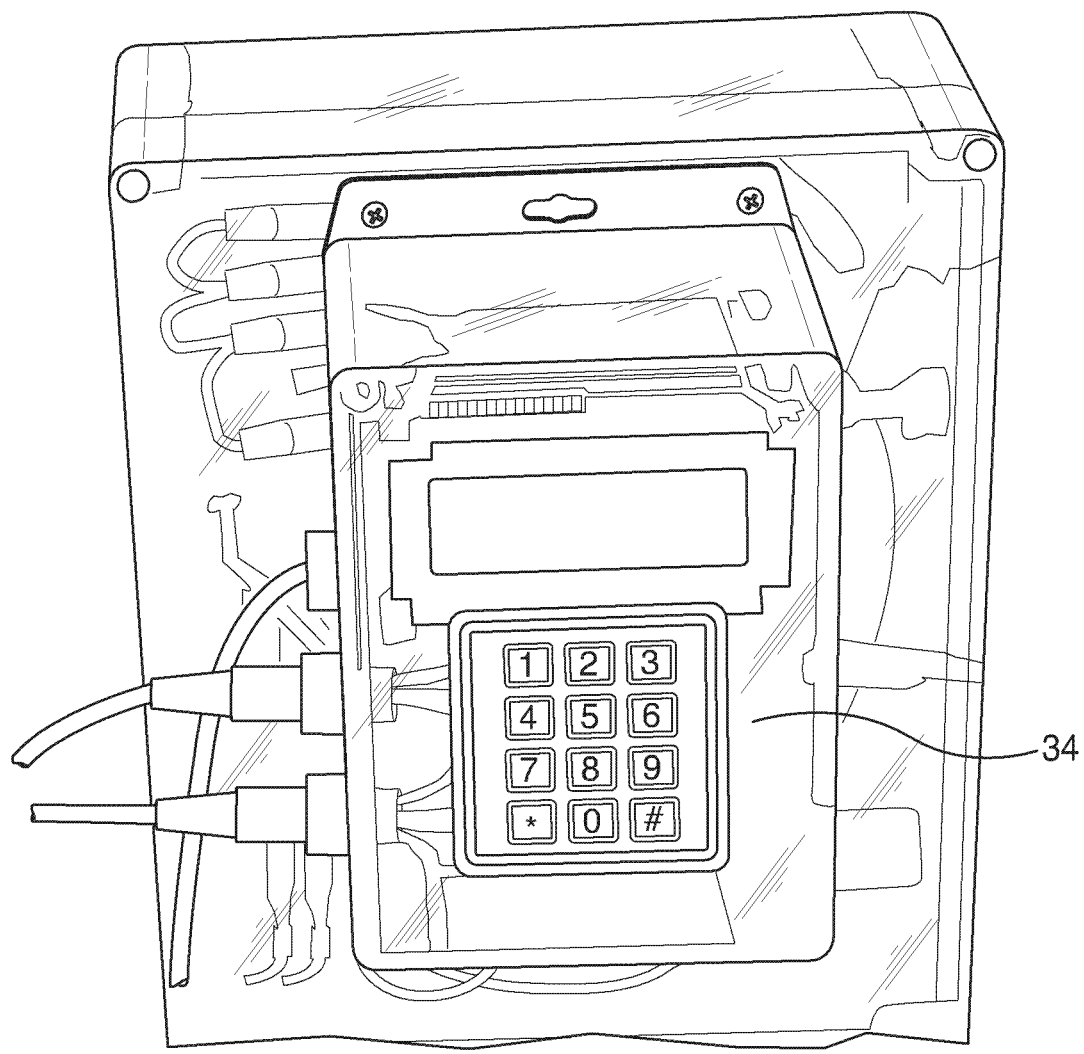
FIG. 18 shows a computer for the recycler.

FIG. 18 shows a computer 34 for a recycler 532. In operation, substrate sheets are printed upon and are then conveyed on a conveyor belt underneath the trough 530 of the powder system. The computer 34 reads through a sensor when each substrate sheet approaches the trough 530, and turns on vibration of the powder applicator trough 530 to facilitate powder flowing through the trough and getting dispensed on the substrate sheet being conveyed. A portion of the dispensed powder sticks to wetted areas of the substrate sheet (wetted from printing in a prior step). The recycler will collect the powder that did not stick to the wetted areas of the sheet by vacuuming it off, and then waits for the next sheet. When the sheet exits from the recycler, the computer 34 turns the vibration off to stop or minimize powder flowing out of the trough. This way, the maintenance of recycled powder in the trough is maximized.

Figure 19:
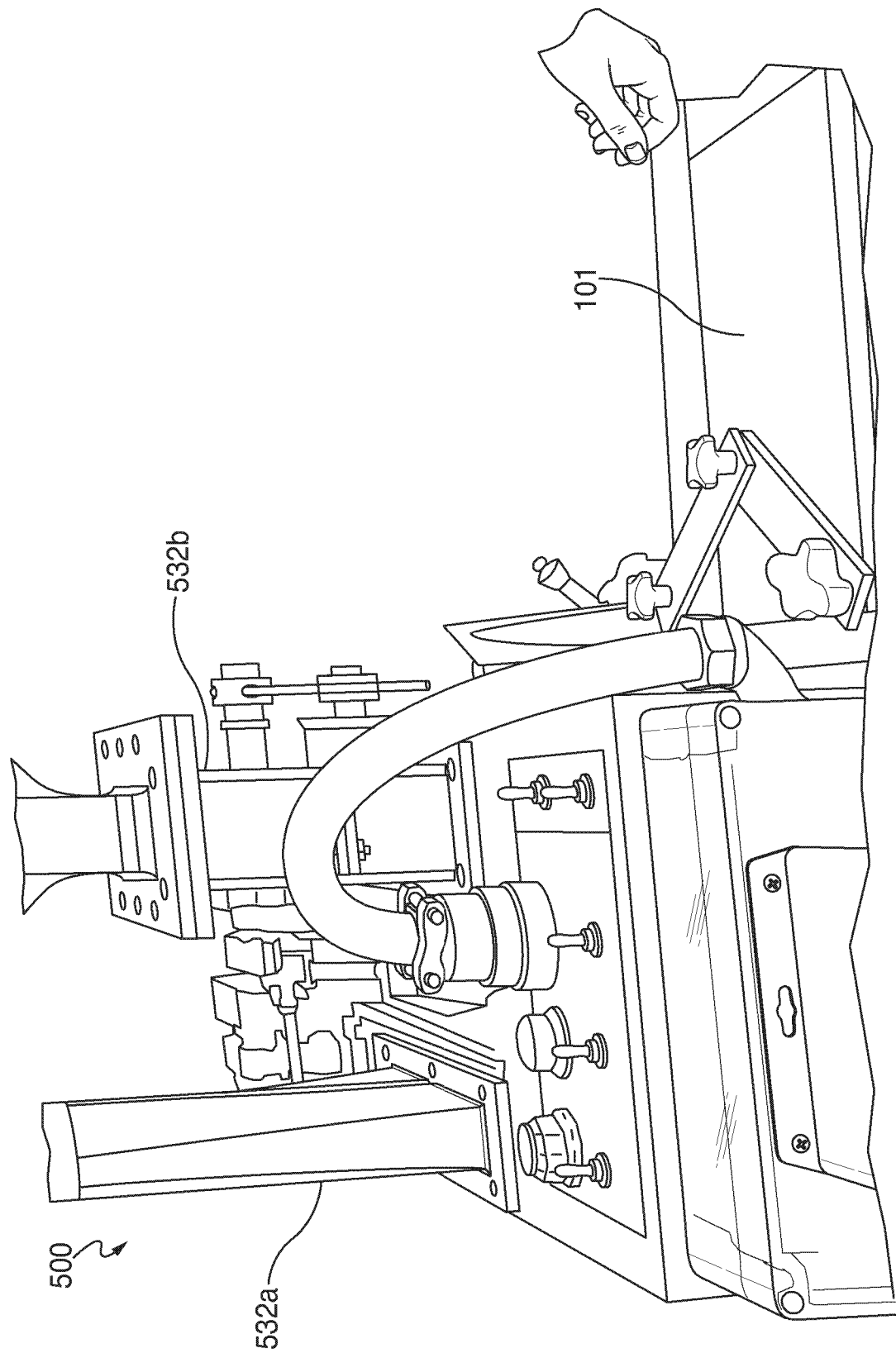
FIG. 19 illustrates a sheet as it is about to be processed through the powder system.
Figure 20:
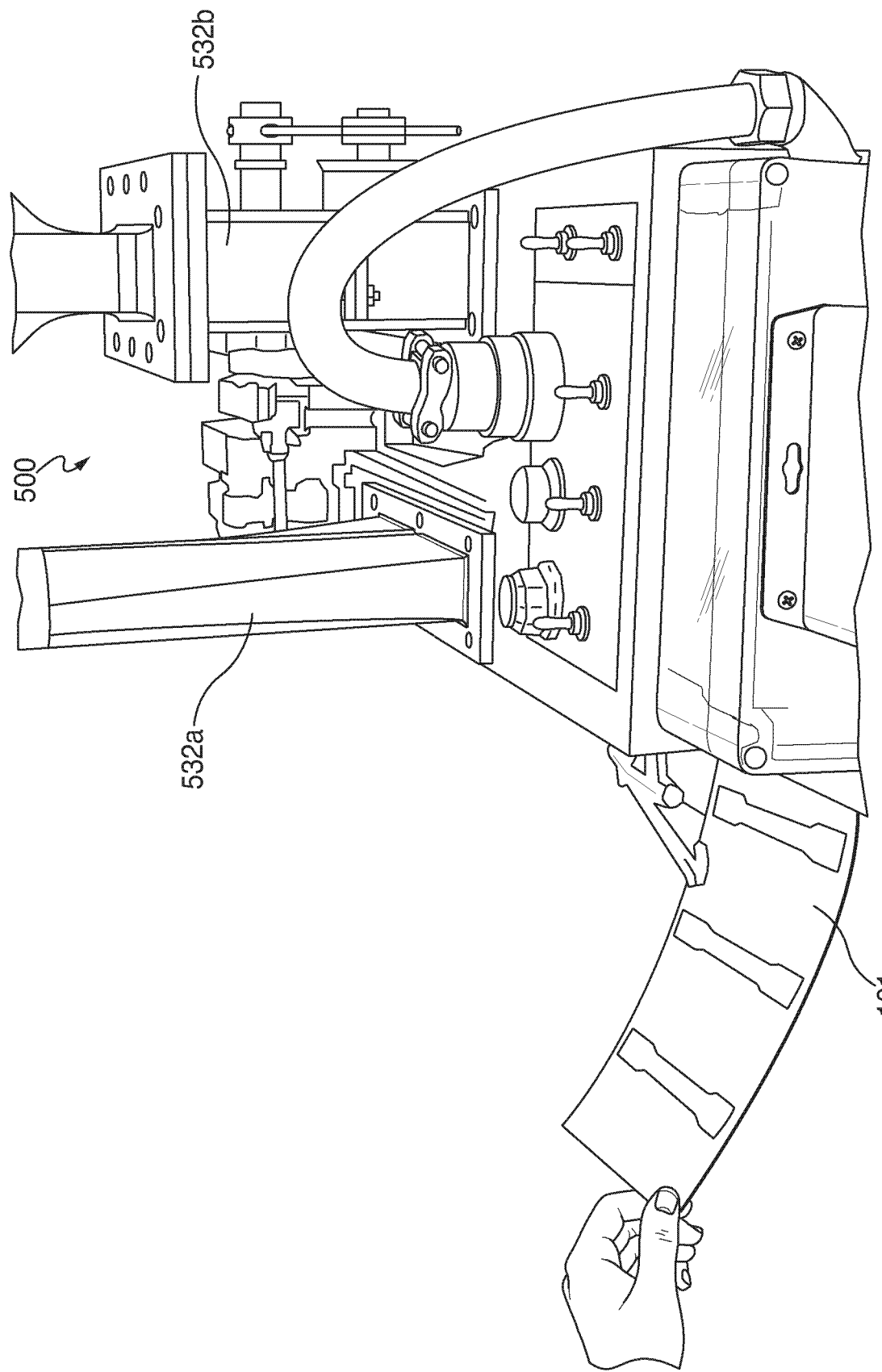
FIG. 20 shows a sheet as it exits the powder system.
Figure 21:
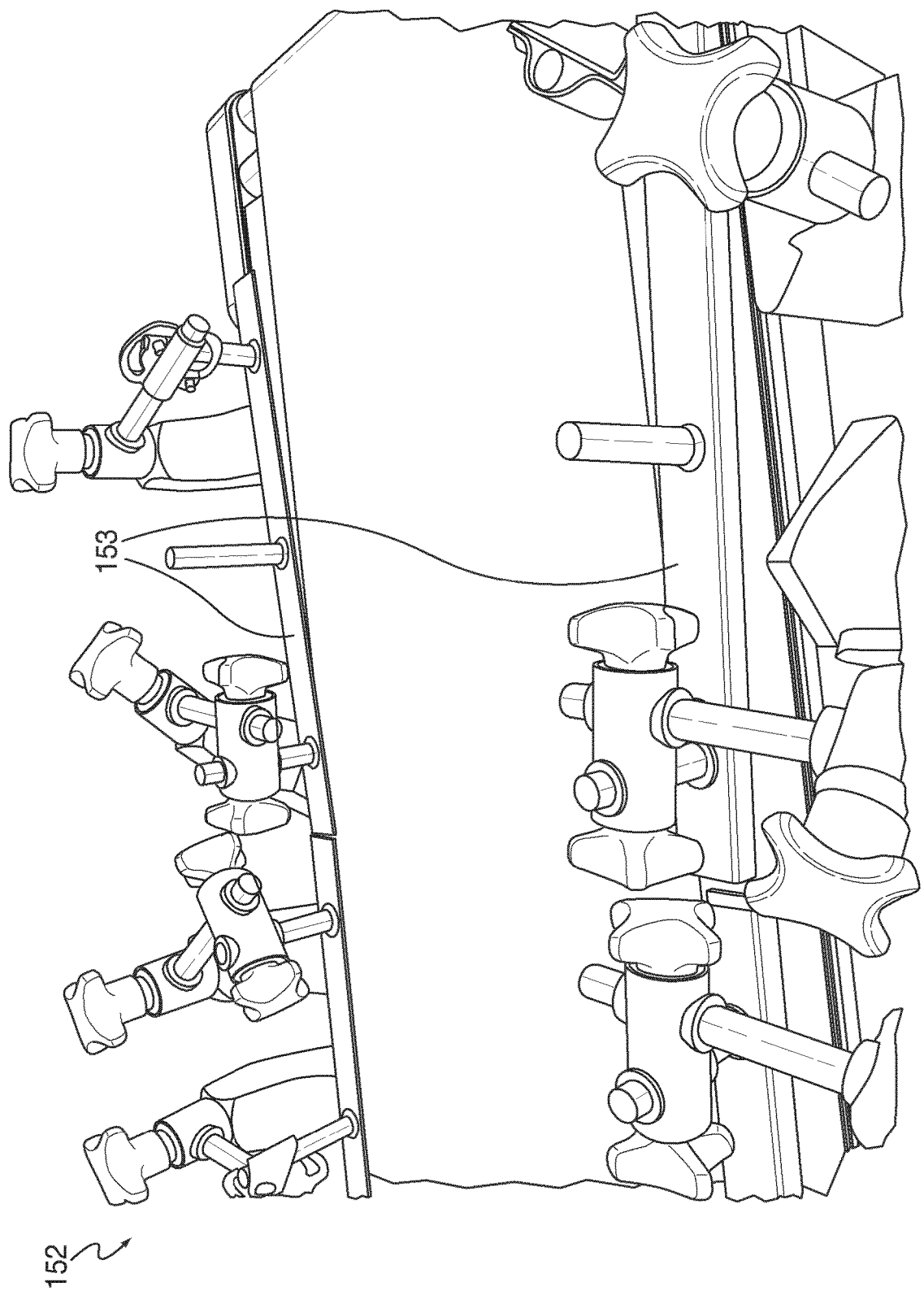
FIG. 21 is a view of a conveyor.
Figure 22:
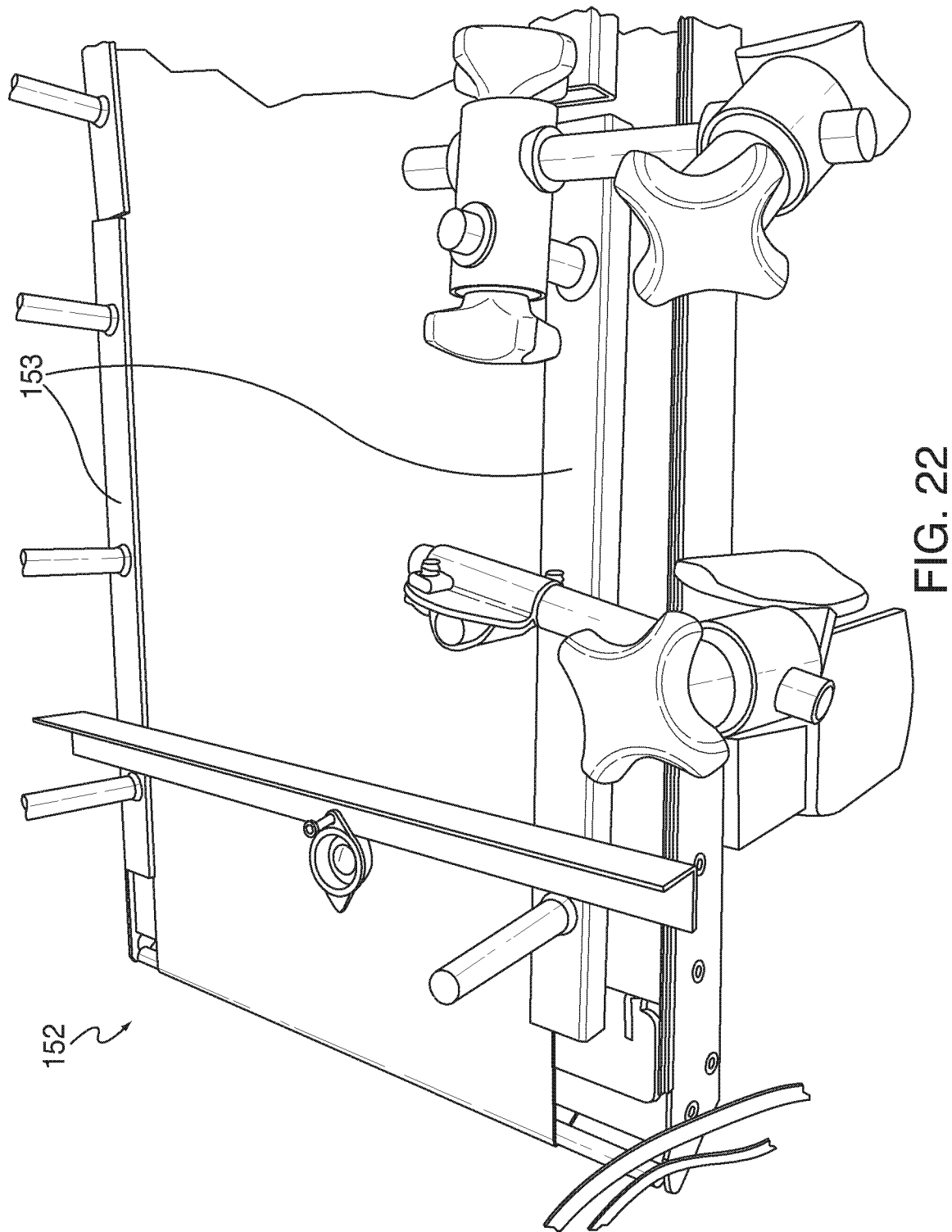
FIG. 22 is another view of the conveyor.
Figure 23:
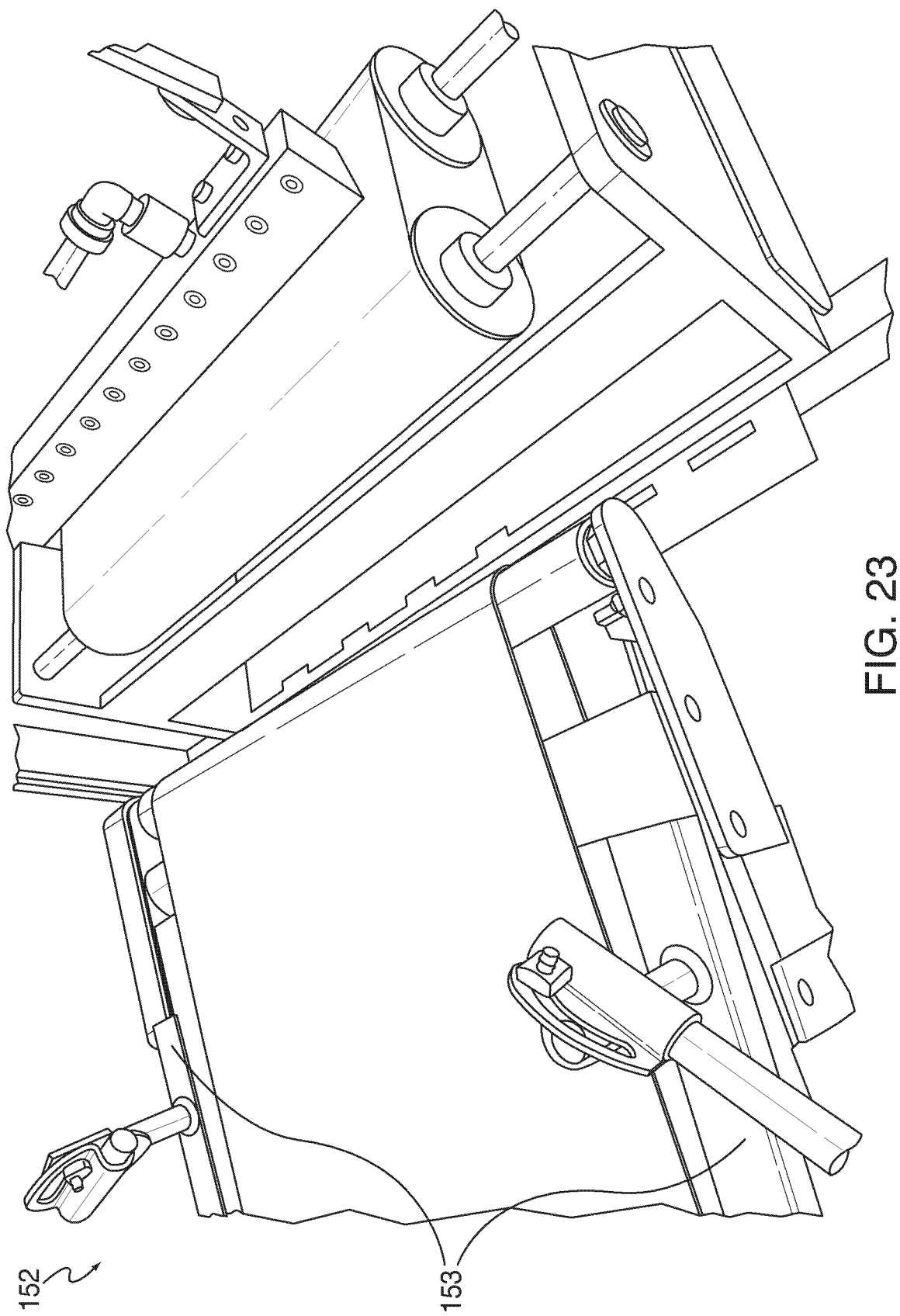
FIG. 23 is another view of the conveyor.
Figure 24:
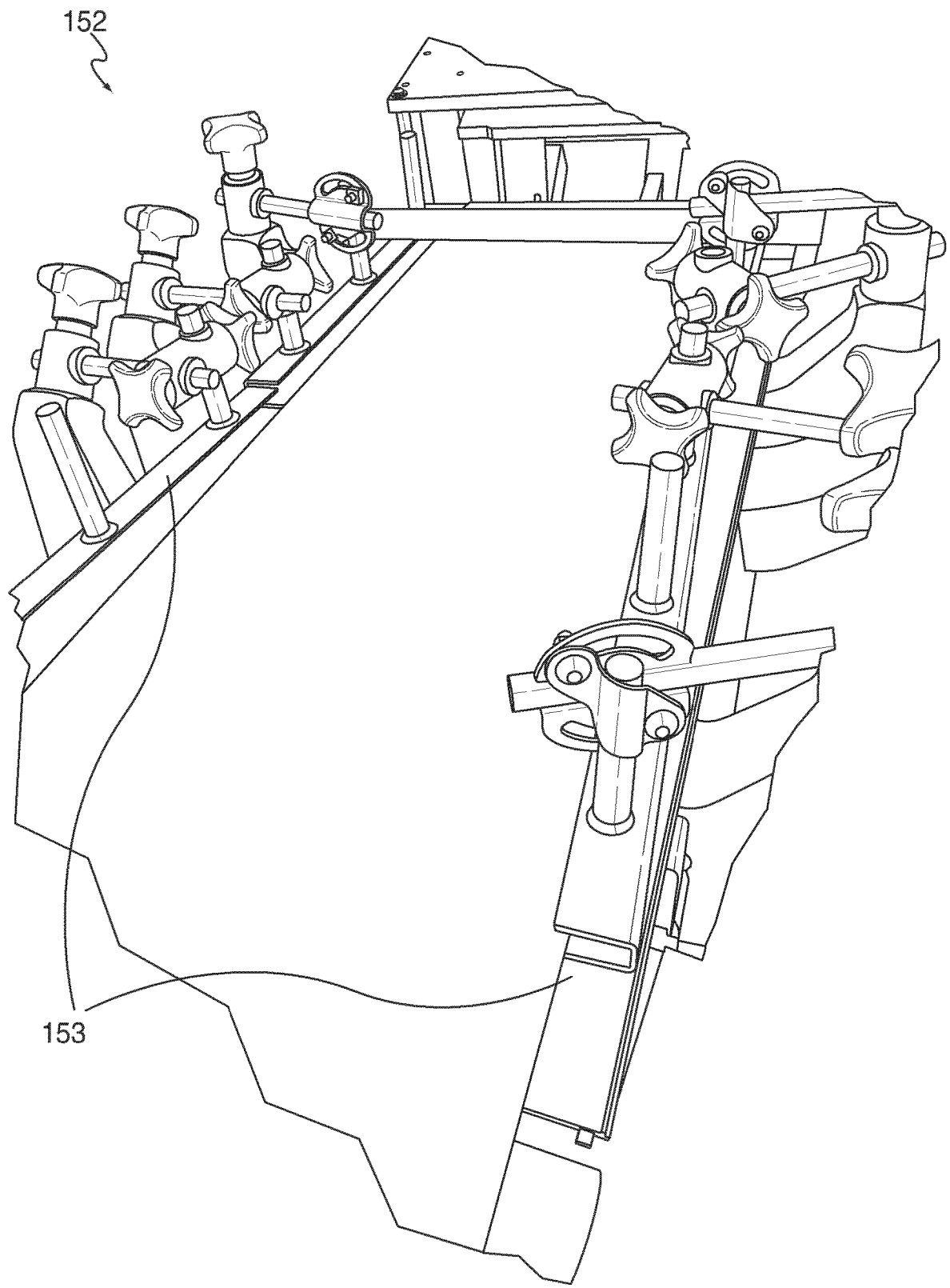
FIG. 24 is another view of the conveyor.
Figure 25:
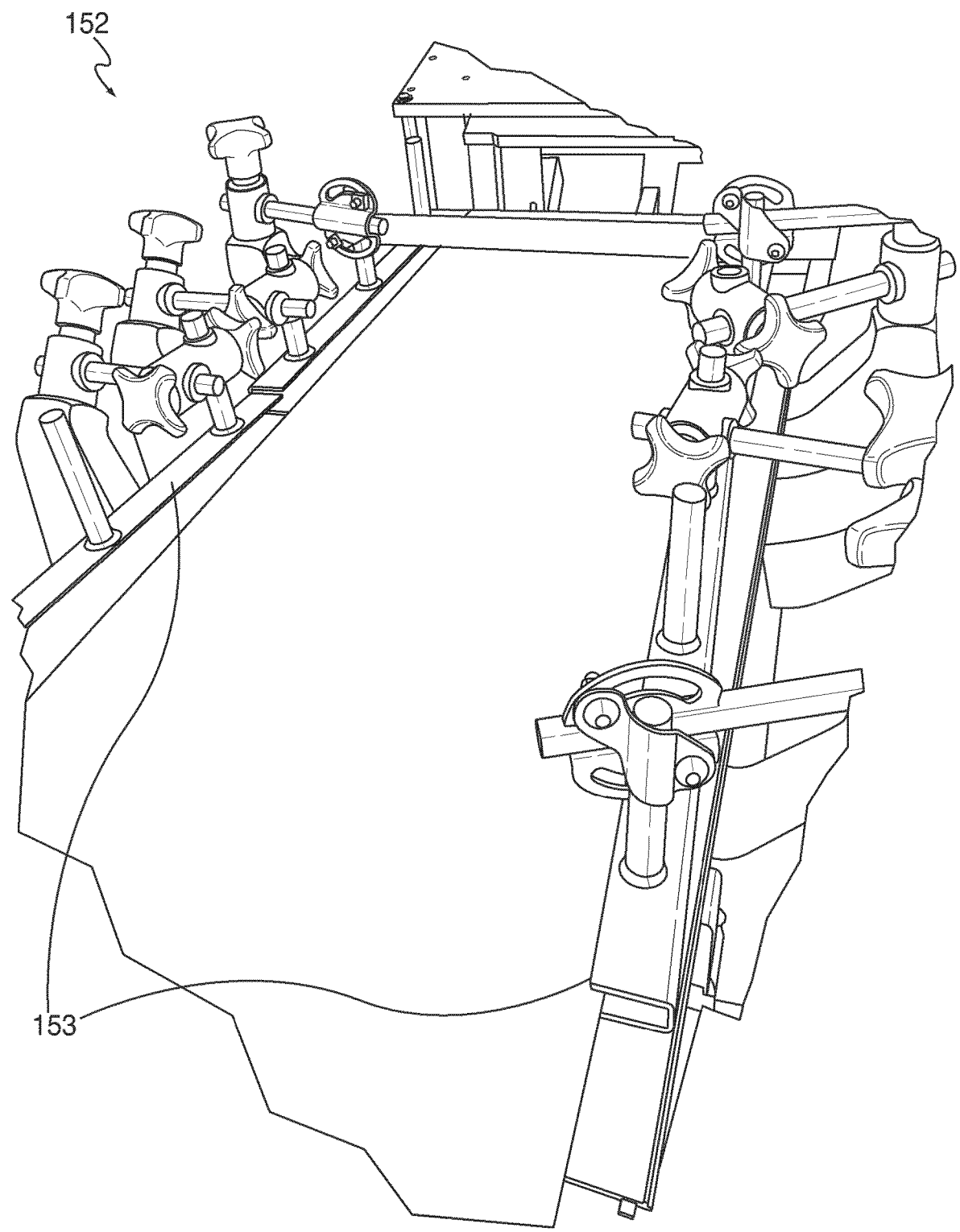
FIG. 25 is another view of the conveyor.

FIG. 19 shows a sheet 101 as it is about to enter the powder system 500. FIG. 20 shows a sheet 101 as it exits the powder system 500.

FIGS. 21-25 illustrate an example conveyor 152 with channels 153. The conveyor conveys the substrate sheets out of the powder system 500. The channels 153 align the sheet 101 (for example if a rectangular sheet is not rectilinear with respect to the conveyor 152).

Figure 26:
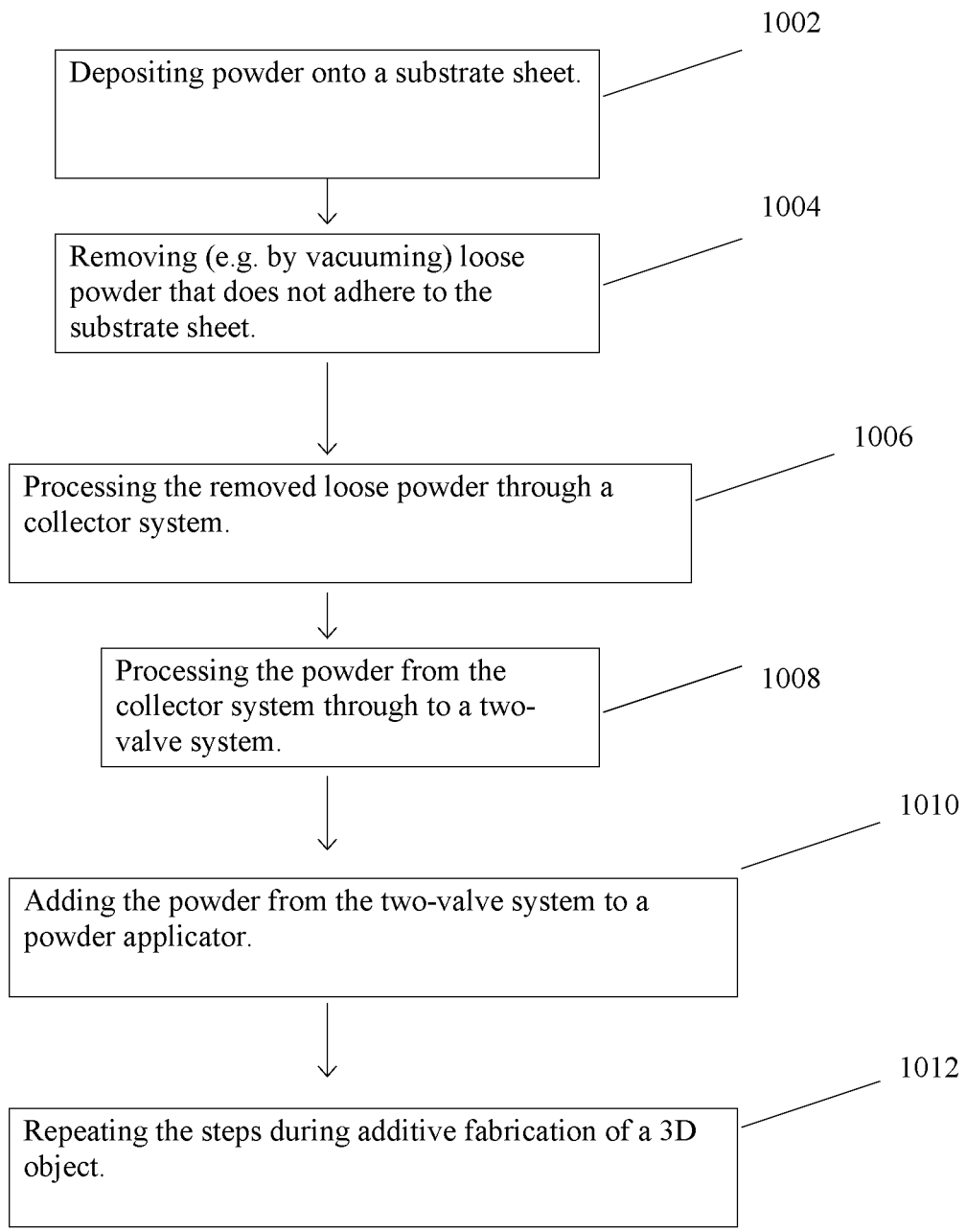
FIG. 26 depicts a flowchart showing the steps of a method for applying and recycling powder during an additive manufacturing process.

FIG. 26 depicts a flowchart showing the steps of a method for applying and recycling powder during an additive manufacturing process. The steps include depositing powder onto a substrate sheet 1002; removing loose powder that does not adhere to the substrate sheet 1004; processing the removed loose powder through a collector system 1006; processing the powder from the collector system through to a two-valve system 1008; adding the powder from the two-valve system to a power applicator 1010; and repeating the steps during additive fabrication of a 3D object.

Figure 27:
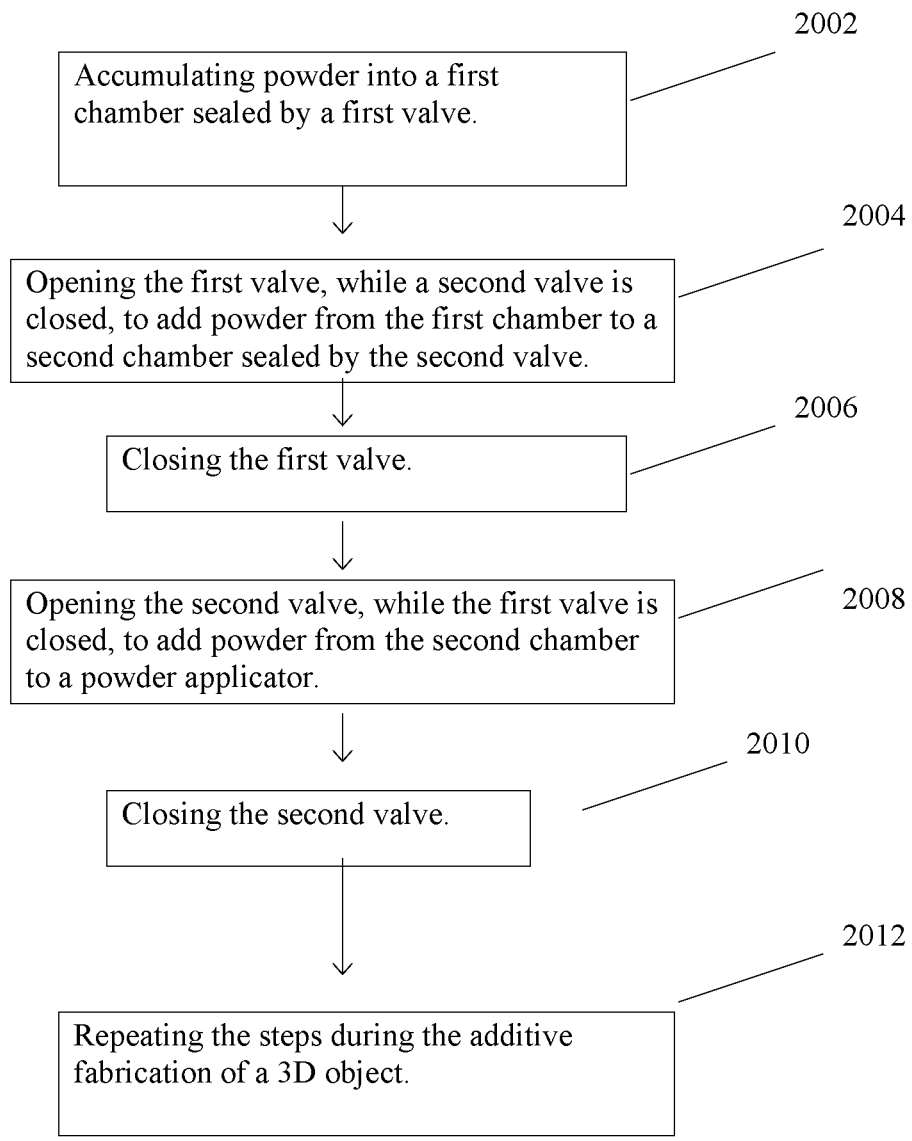
FIG. 27 depicts a flowchart showing the steps of a method of processing powder through a two-valve system during an additive manufacturing process.

FIG. 27 depicts a flowchart showing the steps of a method of processing powder through a two-valve system during an additive manufacturing process. The steps include accumulating powder into a first chamber sealed by a first valve 2002; opening the first valve, while a second valve is closed, to add powder from the first chamber to a second chamber sealed by the second valve 2004; closing the first valve 2006; opening the second valve, while the first valve is closed, to add powder from the second chamber to a powder applicator 2008; closing the second valve 2010; and repeating the steps during additive fabrication of a 3D object 2012.

Figure 28:
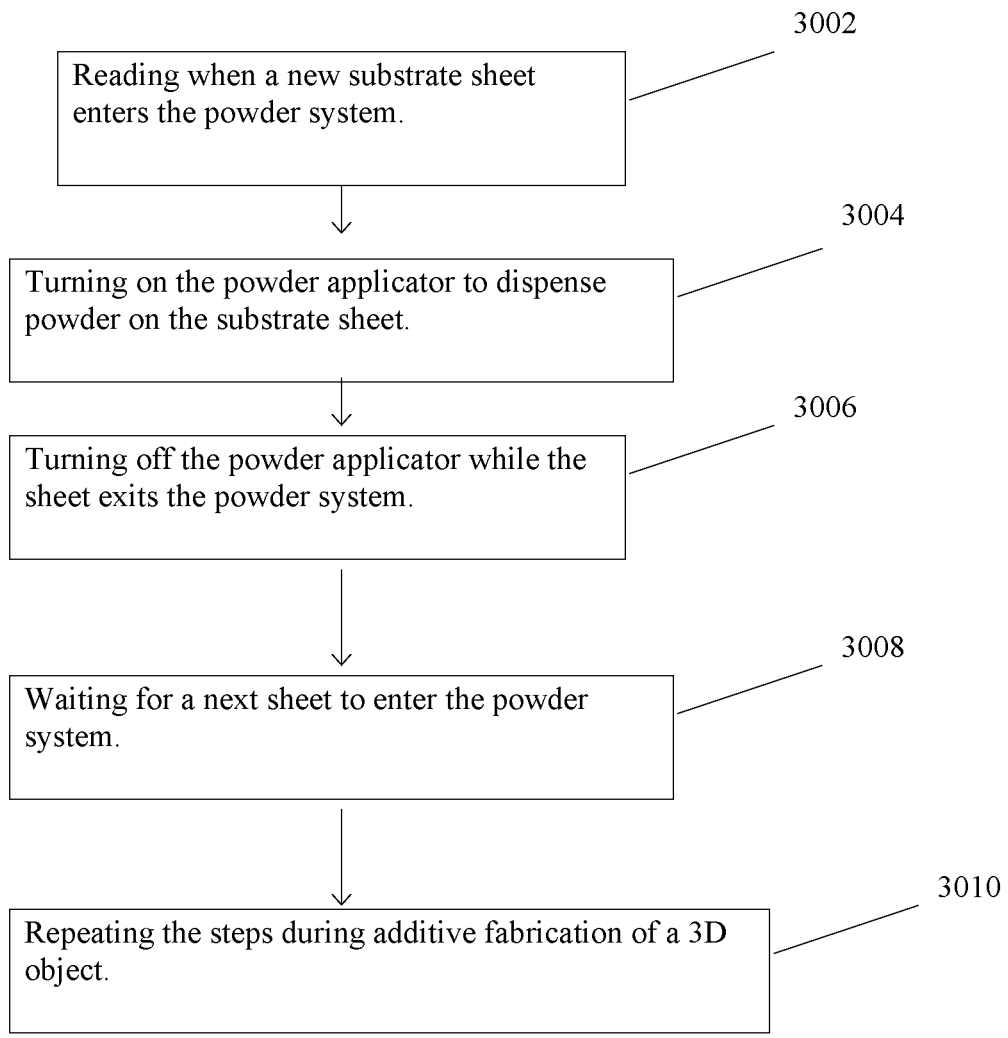
FIG. 28 depicts control steps implemented by a computer to control the method of processing a substrate sheet through the powder system.

FIG. 28 depicts control steps implemented by a computer to control the method of processing a substrate sheet through the powder system. The steps include reading when a new substrate sheet enters the powder system 3002; turning on the powder applicator to dispense powder on the substrate sheet 3004; turning off the powder applicator while the sheet exits the powder system 3006; waiting for a next sheet to enter the powder system 3008; and repeating the steps during additive fabrication of a 3D object 3010.

While the above specification and examples provide a description of the invention, many embodiments of the invention can be made without departing from the spirit and scope of the invention. It is to be understood that the foregoing embodiments are provided as illustrative only, and do not limit or define the scope of the invention. Various other embodiments are also within the scope of the claims.

I claim:

1. A double dump valve apparatus comprising:
   a top flap,
   a bottom flap configured such that the top and bottom flaps cannot both be open at the same time,
   the top and bottom flaps are configured so that the top flap opens in a first horizontal orientation to one side, and the bottom flap opens in a second horizontal orientation to another side, wherein the first and second horizontal orientations are opposite one another,
   wherein the top flap has a flange and a gasket, connected to a first chamber and to a first hinge, the first hinge allowing the top flap to open to the one side, and
   the bottom flap located below the top flap, having a flange and gasket, connected to a second chamber and to a second hinge, the second hinge allowing the bottom flap to open to the another side horizontally opposite the one side, and
   a mechanism to open and close the top flap and to open and close the bottom flap.

2. The apparatus of claim 1, wherein
   a spring is coupled to both the top flap and bottom flap in a manner that ensures that both flaps are never simultaneously open.

* * * * *